(12) United States Patent
Kim et al.

(10) Patent No.: US 12,032,756 B2
(45) Date of Patent: Jul. 9, 2024

(54) INPUT DEVICE AND ELECTRONIC DEVICE COMPRISING THE SAME

(71) Applicant: Samsung Display Co., Ltd., Yongin-si (KR)

(72) Inventors: Junghak Kim, Hwaseong-si (KR); Kyowon Ku, Seoul (KR); Youngsik Kim, Yongin-si (KR); Hansu Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/084,436

(22) Filed: Dec. 19, 2022

(65) Prior Publication Data

US 2023/0214030 A1    Jul. 6, 2023

(30) Foreign Application Priority Data

Jan. 3, 2022    (KR) .......................... 10-2022-0000471

(51) Int. Cl.
*G06F 3/0354* (2013.01)
*G06F 3/038* (2013.01)

(52) U.S. Cl.
CPC .......... *G06F 3/03545* (2013.01); *G06F 3/038* (2013.01)

(58) Field of Classification Search
CPC .............................. G06F 3/03545; G06F 3/038
See application file for complete search history.

(56) References Cited

U.S. PATENT DOCUMENTS

| | | | |
|---|---|---|---|
| 8,199,132 B1 | 6/2012 | Oda et al. | |
| 8,638,320 B2 | 1/2014 | Harley et al. | |
| 9,569,041 B2 | 2/2017 | Son | |
| 11,112,890 B2 | 9/2021 | Woo et al. | |
| 2004/0169439 A1* | 9/2004 | Toda ..................... | B06B 1/0655 310/328 |
| 2012/0327042 A1* | 12/2012 | Harley ................. | G06F 3/0442 345/179 |
| 2014/0062833 A1* | 3/2014 | Jian ......................... | H01Q 3/01 343/882 |
| 2015/0309598 A1* | 10/2015 | Zeliff ..................... | H02H 9/046 345/179 |
| 2017/0068337 A1* | 3/2017 | Bhandari ................. | H01G 5/12 |
| 2017/0285771 A1* | 10/2017 | Jung ..................... | G06F 3/0383 |
| 2018/0107293 A1* | 4/2018 | Yeh ........................ | B43K 29/08 |
| 2018/0131076 A1* | 5/2018 | Chen .................... | H01Q 1/1235 |

(Continued)

FOREIGN PATENT DOCUMENTS

| | | |
|---|---|---|
| KR | 10-1029436 B1 | 4/2011 |
| KR | 10-1995403 B1 | 7/2019 |

(Continued)

*Primary Examiner* — Ariel A Balaoing
(74) *Attorney, Agent, or Firm* — Lewis Roca Rothgerber Christie LLP

(57) ABSTRACT

An input device includes: a housing; a tip electrode protruding outside of the housing and configured to transmit a downlink signal to the outside; a reception electrode inside the housing and configured to receive an uplink signal from the outside; and a communication circuit electrically connected to the tip electrode and the reception electrode and configured to receive the uplink signal from the reception electrode or to transmit the downlink signal to the tip electrode, wherein a surface of the reception electrode has a concave-convex structure.

14 Claims, 28 Drawing Sheets

(56) References Cited

U.S. PATENT DOCUMENTS

| | | | | |
|---|---|---|---|---|
| 2021/0153936 A1* | 5/2021 | Mosesov | ............ | A61B 18/1815 |
| 2023/0133003 A1* | 5/2023 | Noguchi | ............. | G06F 3/04162 |
| | | | | 345/179 |
| 2023/0145244 A1* | 5/2023 | Clevorn | ................. | G06F 3/016 |
| | | | | 345/173 |

FOREIGN PATENT DOCUMENTS

| KR | 10-2020-0116331 A | 10/2020 |
|---|---|---|
| KR | 10-2364099 B1 | 2/2022 |

* cited by examiner

INPUT DEVICE AND ELECTRONIC DEVICE COMPRISING THE SAME

CROSS-REFERENCE TO RELATED APPLICATION

The present application claims priority to and the benefit of Korean Patent Application No. 10-2022-0000471 filed on Jan. 3, 2022, in the Korean Intellectual Property Office, the entire disclosure of which is incorporated herein by reference.

BACKGROUND

Multimedia electronic devices such as TVs, mobile phones, tablet personal computers (PCs), navigation systems, game consoles, and the like generally include a display device that displays images. In addition to a general input method such as a button, a keyboard, a mouse, or the like, a display device may include an input sensor capable of providing a touch-based input method that allows users to enter information or commands relatively easily and intuitively.

The input sensor may sense touch or pressure from the user's body (e.g., a user's finger). In the meantime, there is an increasing demand for employing a pen for a fine touch input for a user who is accustomed to entering information by using writing instruments or for a specific application (e.g. an application for sketching or drawing). The display device may detect external input applied from the outside of the display device. The external input may be a user input using an input device (e.g., an electronic pen, stylus, or the like).

The above information disclosed in this Background section is only for enhancement of understanding of the background and therefore the information discussed in this Background section does not necessarily constitute prior art.

SUMMARY

Aspects of some embodiments of the present disclosure described herein relate to an input device and an electronic device including the same, and for example, to an input device having relatively improved performance and an electronic device including the same.

Aspects of some embodiments of the present disclosure include an input device with relatively improved performance and an electronic device including the same.

According to some embodiments, an input device includes housing, a tip electrode protruding to an outside of the housing and transmitting a downlink signal to the outside, a reception electrode positioned inside the housing and receiving an uplink signal from the outside, and a communication circuit electrically connected to the tip electrode and the reception electrode and receiving the uplink signal from the reception electrode or to transmit the downlink signal to the tip electrode. According to some embodiments, a surface of the reception electrode may have a concave-convex structure.

According to some embodiments, an input device includes housing, a tip electrode protruding to an outside of the housing, an internal electrode positioned inside of the housing, a communication circuit electrically connected to the tip electrode and the internal electrode. According to some embodiments, a surface of the internal electrode has a concave-convex structure.

According to some embodiments, an electronic device includes a display device including a display panel and an input sensor on the display panel and an input device receiving an uplink signal from the input sensor and outputting a downlink signal to the input sensor.

According to some embodiments, the input device includes housing, a tip electrode protruding to an outside of the housing and configured to transmit a downlink signal to the outside, a reception electrode positioned inside the housing and receiving an uplink signal from the outside, and a communication circuit electrically connected to the tip electrode and the reception electrode and receiving the uplink signal from the reception electrode or transmitting the downlink signal to the tip electrode. According to some embodiments, a surface of the reception electrode has a concave-convex structure.

BRIEF DESCRIPTION OF THE FIGURES

The above and other aspects and characteristics of embodiments according to the present disclosure will become more apparent by describing in more detail aspects of some embodiments thereof with reference to the accompanying drawings.

DETAILED DESCRIPTION

Figure 1:
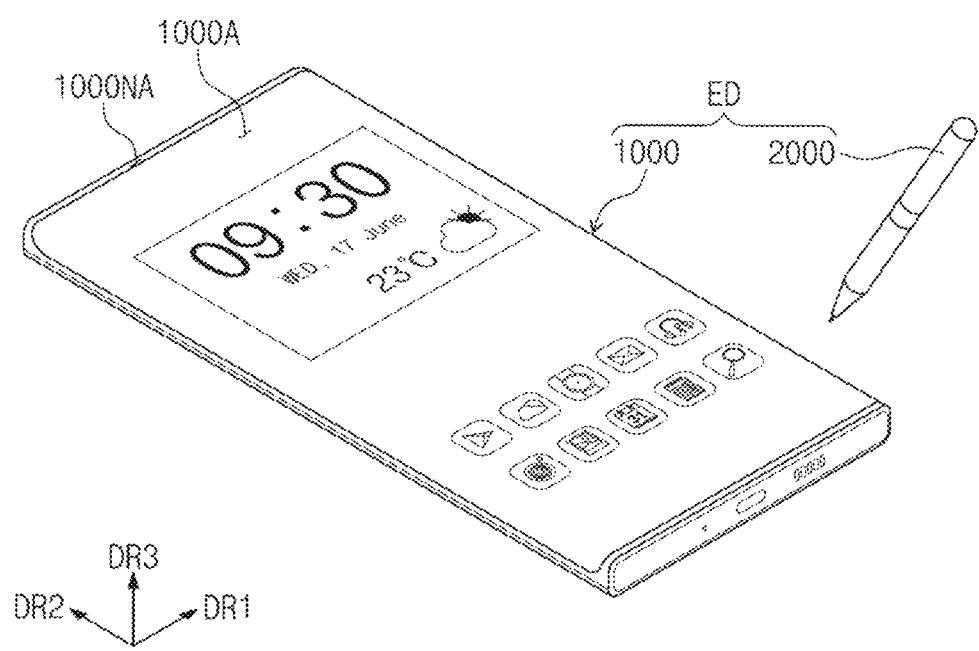
FIGS. 1 and 2 are perspective views illustrating an electronic device, according to some embodiments of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, aspects of some embodiments of the present disclosure will be described in more detail with reference to accompanying drawings.

FIG. 1 is a perspective view illustrating an electronic device, according to some embodiments of the present disclosure.

Referring to FIG. 1, an electronic device ED may include a display device 1000 and an input device 2000. The display device 1000 may be a device activated according to an electrical signal. For example, the display device 1000 may be a mobile phone, a tablet PC, a car navigation system, a game console, or a wearable device, but is not limited thereto. FIG. 1 illustrates that the display device 1000 is a mobile phone.

An active area 1000A and a peripheral area 1000NA may be defined in the display device 1000. The display device 1000 may display images at the active area 1000A. The active area 1000A may include a surface or plane defined by a first direction DR1 and a second direction DR2 (e.g., a second direction perpendicular to the first direction DR1). The peripheral area 1000NA may surround the active area 1000A.

A thickness direction of the display device 1000 may be parallel to a third direction DR3 intersecting the plane or surface defined by the first direction DR1 and the second direction DR2. That is, the third direction DR3 may be perpendicular or normal with respect to the plane or surface defined by the first direction DR1 and the second direction DR2. Accordingly, front surfaces (or upper surfaces) and back surfaces (or lower surfaces) of members constituting the display device 1000 may be defined based on the third direction DR3.

The display device 1000 may detect inputs applied from the outside of the display device 1000. The inputs applied from the outside may include various types of external inputs such as a portion of a user's body, light, heat, pressure, or the like. The display device 1000 illustrated in FIG. 1 may detect an input by the user's touch and an input by the input device 2000. The input device 2000 may refer to a device other than the user's body. The input by the input device 2000 may be referred to as a "first input", and the input by the user's touch (e.g., a touch of a user's finger) may be referred to as a "second input". For example, the input device 2000 may be an active pen, a stylus pen, a touch pen, or an electronic pen. Hereinafter, it is described that the input device 2000 is the active pen.

The display device 1000 may communicate with the input device 2000 bidirectionally. The display device 1000 may provide an uplink signal to the input device 2000. For example, the uplink signal may include a synchronization signal or information of the display device 1000, but embodiments according to the present disclosure are not particularly limited thereto. The input device 2000 may provide a downlink signal to the display device 1000. The downlink signal may include state information of the input device 2000 or the synchronization signal. For example, the downlink signal may include coordinate information of the input device 2000, battery information of the input device 2000, slope information of the input device 2000, and/or various pieces of information stored in the input device 2000, but is not particularly limited thereto. The uplink signal and the downlink signal will be described later.

Figure 2:
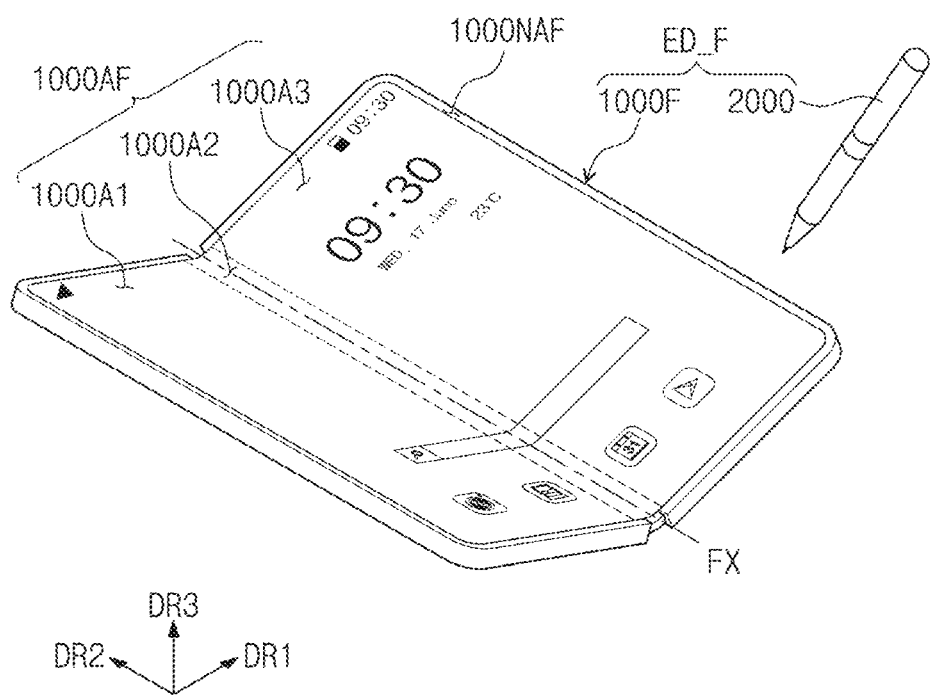

FIG. 2 is a perspective view illustrating an electronic device, according to some embodiments of the present disclosure. In the description of FIG. 2, the same reference numerals are assigned to the same components described with reference to FIG. 1, and thus some of the description thereof may be omitted to avoid redundancy. Referring to FIG. 2, an electronic device ED_F according to some embodiments of the present disclosure includes a display device 1000F and the input device 2000. The display device 1000F may display an image through an active area 1000AF. FIG. 2 illustrates that the display device 1000F is folded at an angle (e.g., a set or predetermined angle). The active area 1000AF may include a plane defined by the first direction DR1 and the second direction DR2, while the display device 1000F is unfolded. The display device 1000F may further include a peripheral area 1000NAF adjacent to the active area 1000AF.

The active area 1000AF may include a first active area 1000A1, a second active area 1000A2, and a third active area 1000A3. The first active area 1000A1, the second active area 1000A2, and the third active area 1000A3 may be sequentially defined in the first direction DR1. The second active area 1000A2 may be bent about a folding axis FX extending in the second direction DR2. Accordingly, the first active area 1000A1 and the third active area 1000A3 may be referred to as "non-folding areas", and the second active area 1000A2 may be referred to as a "folding area".

When the display device 1000F is folded, the first active area 1000A1 and the third active area 1000A3 may face each other. Accordingly, while the display device 1000F is fully folded, the active area 1000AF may not be exposed to the outside, which may be referred to as "in-folding". However, embodiments according to the present disclosure are not limited thereto and the operation of the display device 1000F is not limited thereto.

According to some embodiments of the present disclosure, when the display device 1000F is folded, the first active area 1000A1 and the third active area 1000A3 may be opposite to each other. Accordingly, in a state where the display device 1000F is folded, the active area 1000AF may be exposed to the outside, which may be referred to as "out-folding".

The display device 1000F may perform only one operation of an in-folding operation or an out-folding operation. Alternatively, the display device 1000F may perform both the in-folding operation and the out-folding operation. In this case, the same area of the display device 1000F, for example, the second active area 1000A2 may be folded inwardly and outwardly.

One folding area and two non-folding areas are illustrated in FIG. 2, but the number of folding areas and the number of non-folding areas are not limited thereto. For example, the display device 1000F may include a plurality of non-folding areas, of which the number is greater than two, and a plurality of folding areas, each of which is interposed between non-folding areas adjacent to one another.

FIG. 2 illustrates that the folding axis FX extends in the second direction DR2, but embodiments according to the present disclosure are not limited thereto. For example, the folding axis FX may extend in a direction parallel to the first direction DR1. In this case, the first active area 1000A1, the second active area 1000A2, and the third active area 1000A3 may be sequentially arranged in the second direction DR2.

The active area 1000AF may overlap at least one electronic module. For example, the electronic module may include a camera module, a proximity illuminance sensor, and the like. The electronic module may receive an external input delivered through the active area 1000AF or may provide an output through the active area 1000AF. A part of the active area 1000AF that overlaps the camera module, the proximity illuminance sensor, and the like may have a higher transmittance than another part of the active area 1000AF. Accordingly, there is no need to position the peripheral area 1000NAF in an area in which a plurality of electronic modules are to be positioned. As a result, an area ratio of the active area 1000AF to the front surface of the display device 1000F may increase, and an area ratio of the peripheral area 1000NAF to the front surface of the display device 1000F may decrease.

The display device 1000F may communicate with the input device 2000 bidirectionally. The display device 1000F may provide an uplink signal to the input device 2000. The input device 2000 may provide a downlink signal to the display device 1000F. The display device 1000F may detect coordinates of the input device 2000 by using the downlink signal provided from the input device 2000.

Figure 3:
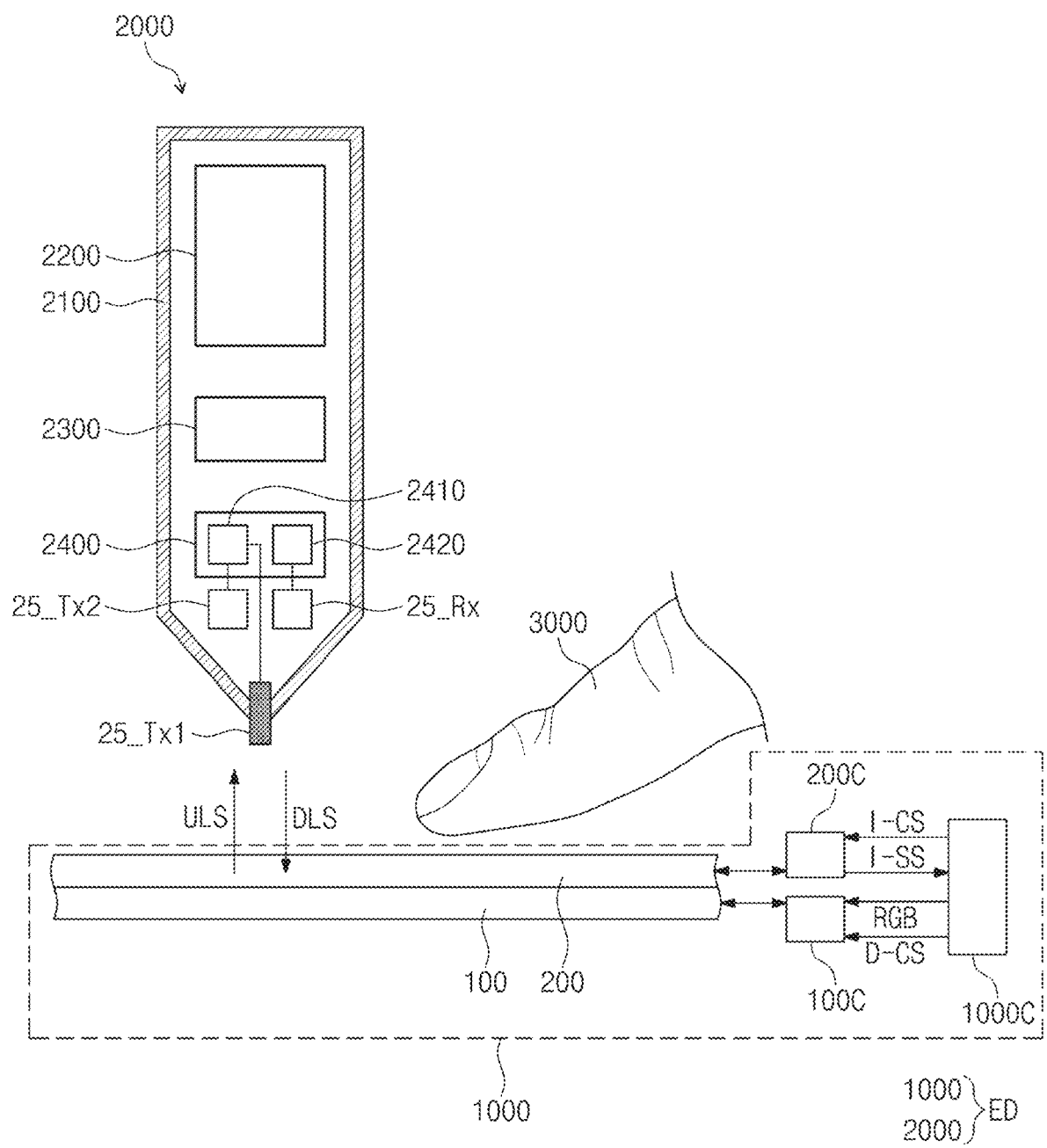
FIG. 3 is a block diagram illustrating an electronic device according to some embodiments of the present disclosure.

FIG. 3 is a block diagram schematically illustrating a display device and an input device, according to some embodiments of the present disclosure.

Referring to FIG. 3, the display device 1000 may include a display panel 100, an input sensor 200, a panel driver 100C, a sensor controller 200C, and a main controller 1000C.

The display panel 100 may be a configuration that substantially generates an image. The display panel 100 may be a light emitting display panel. For example, the display panel 100 may be an organic light emitting display panel, an inorganic light emitting display panel, a quantum dot display panel, a micro LED display panel, or a nano LED display panel.

The input sensor 200 may be located on the display panel 100. The input sensor 200 may detect an external input applied from the outside. The input sensor 200 may detect a first input by the input device 2000 and a second input by a user's body 3000.

The main controller 1000C may control overall operations of the display device 1000. For example, the main controller 1000C may control operations of the panel driver 100C and the sensor controller 200C. The main controller 1000C may include at least one microprocessor, and the main controller 1000C may be referred to as a "host".

The panel driver 100C may control the display panel 100. The main controller 1000C may further include a graphic controller. The panel driver 100C may receive an image signal RGB and a first control signal D-CS from the main controller 1000C. The first control signal D-CS may include various signals. For example, the first control signal D-CS may include a vertical synchronization signal, a horizontal synchronization signal, a main clock, and a data enable signal. The panel driver 100C may generate various control signals (e.g., a start signal and a clock signal) for controlling the timing for providing a signal to the display panel 100, based on the first control signal D-CS.

The sensor controller 200C may control the input sensor 200. The sensor controller 200C may receive a second control signal I-CS from the main controller 1000C. The second control signal I-CS may include a clock signal and a mode determination signal for determining an operating mode of the sensor controller 200C. Based on the second control signal I-CS, the sensor controller 200C may operate in a first mode, in which the first input by the input device 2000 is detected, or in a second mode in which the second input by the user's body 3000 is detected. The sensor controller 200C may control the input sensor 200 to operate in the first mode or the second mode based on the mode determination signal.

Based on a signal received from the input sensor 200, the sensor controller 200C may calculate coordinate information of the first input or the second input and may provide a coordinate signal I-SS having coordinate information to the main controller 1000C. The main controller 1000C executes an operation corresponding to a user input based on the coordinate signal I-SS. For example, the main controller 1000C may operate the panel driver 100C based on the coordinate signal I-SS such that a new application image is displayed on the display panel 100.

The input device 2000 may include housing 2100, a power source 2200, a pen controller 2300, a communication module (or communication circuit) 2400, a tip electrode (or pen electrode) 25_Tx1, a reception electrode 25_Rx, and a transmission electrode 25_Tx2. However, the components constituting the input device 2000 are not limited by the listed components. For example, the input device 2000 may further include an electrode switch for switching an operating mode to a signal transmission mode or a signal reception mode, a pressure sensor for sensing pressure, a memory for storing information (e.g., set or predetermined information), or a rotation sensor for sensing rotation.

The housing 2100 may have a pen shape, and an accommodation space may be formed in the housing 2100. The power source 2200, the pen controller 2300, the communication module 2400, the tip electrode 25_Tx1, the reception electrode 25_Rx and the transmission electrode 25_Tx2 may be accommodated in the accommodation space defined inside the housing 2100.

The power source 2200 may supply a power source to the pen controller 2300 and the communication module 2400 inside the input device 2000. The power source 2200 may include a battery or a high capacity capacitor.

The pen controller 2300 may control the operation of the input device 2000. The pen controller 2300 may be an application-specific integrated circuit (ASIC). The pen controller 2300 may be configured to operate depending on a designed program.

The communication module 2400 may include a transmission circuit 2410 and a reception circuit 2420. The transmission circuit 2410 may output a downlink signal DLS to the input sensor 200. The reception circuit 2420 may receive an uplink signal ULS provided from the input sensor 200. The transmission circuit 2410 may receive a signal provided from the pen controller 2300 and may modulate the signal into a signal capable of being sensed by the input sensor 200. The reception circuit 2420 may modulate a signal provided from the input sensor 200 into a signal processable by the pen controller 2300.

The reception electrode 25_Rx is electrically connected to the reception circuit 2420, and the tip electrode 25_Tx1 and the transmission electrode 25_Tx2 are electrically connected to the transmission circuit 2410. The reception electrode 25_Rx and the transmission electrode 25_Tx2 are positioned inside the housing 2100. The reception electrode 25_Rx and the transmission electrode 25_Tx2 may be electrically insulated from each other. A part of the tip electrode 25_Tx1 may protrude from the housing 2100. The input device 2000 may further include cover housing that covers the tip electrode 25_Tx1 exposed from the housing 2100. Alternatively, the tip electrode 25_Tx1 may also be built into the housing 2100 together with the reception electrode 25_Rx and the transmission electrode 25_Tx2.

Figure 4A:
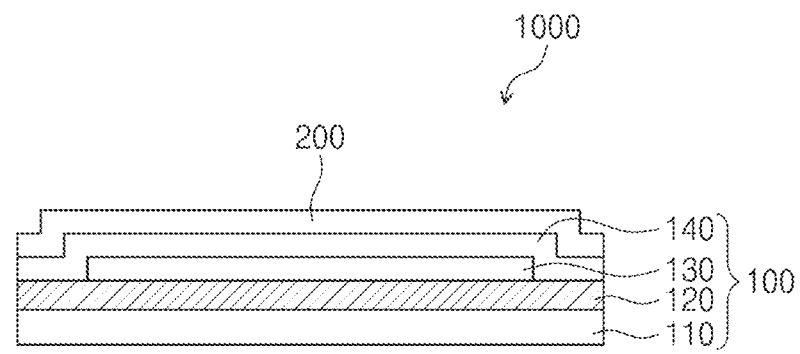
FIGS. 4A and 4B are cross-sectional views of a display device, according to some embodiments of the present disclosure.
Figure 4A:
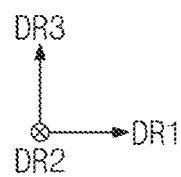

FIG. 4A is a cross-sectional view of a display device, according to some embodiments of the present disclosure.

Referring to FIG. 4A, the display device 1000 may include the display panel 100 and the input sensor 200. The display panel 100 may include a base layer 110, a circuit layer 120, a light emitting element layer 130, and an encapsulation layer 140.

The base layer 110 may be a member that provides a base surface on which the circuit layer 120 is located. The base layer 110 may be a glass substrate, a metal substrate, or a polymer substrate. However, embodiments according to the present disclosure are not limited thereto, and the base layer 110 may be an inorganic layer, an organic layer, or a composite material layer.

The base layer 110 may have a multi-layer structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be referred to as a "base barrier layer".

Each of the first and second synthetic resin layers may include polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. In the meantime, "~~"-based resin in the specification means including the functional group of "~~".

The circuit layer 120 may be located on the base layer 110. The circuit layer 120 may include an insulating layer, a semiconductor pattern, a conductive pattern, and a signal line. The insulating layer, a semiconductor layer, and a conductive layer may be formed on the base layer 110 in a manner such as coating, evaporation, or the like. Afterward, the insulating layer, the semiconductor layer, and the conductive layer may be selectively patterned by performing a photolithography process a plurality of times. Thereafter, the semiconductor pattern, the conductive pattern, and the signal line included in the circuit layer 120 may be formed.

The light emitting element layer 130 may be located on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulation layer 140 may be located on the light emitting element layer 130. The encapsulation layer 140 may protect the light emitting element layer 130 from foreign substances such as moisture, oxygen, and dust particles.

The input sensor 200 may be formed on the display panel 100 through continuous processes. In this case, it may be expressed that the input sensor 200 is directly located on the display panel 100. The expression "directly located" may mean that the third component is not interposed between the input sensor 200 and the display panel 100. That is, a separate adhesive member may not be interposed between the input sensor 200 and the display panel 100. Alternatively, the input sensor 200 may be coupled to the display panel 100 through an adhesive member. The adhesive member may include a typical adhesive or a sticking agent.

Figure 4B:
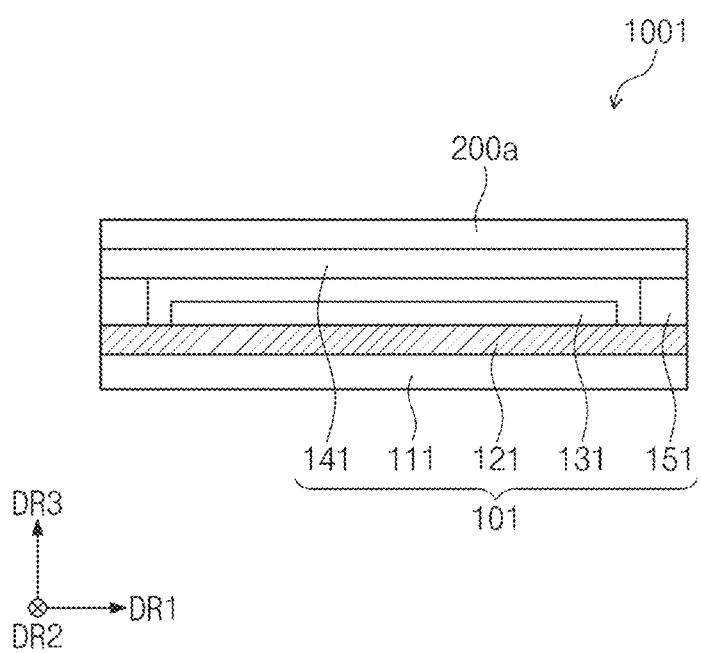

FIG. 4B is a cross-sectional view of a display device, according to some embodiments of the present disclosure.

Referring to FIG. 4B, the display device 1001 may include a display panel 101 and an input sensor 200a. The display panel 101 may include a base substrate 111, a circuit layer 121, a light emitting element layer 131, an encapsulation substrate 141, and a coupling member 151.

Each of the base substrate 111 and the encapsulation substrate 141 may be a glass substrate, a metal substrate, a polymer substrate, or the like, but is not particularly limited thereto.

The coupling member 151 may be interposed between the base substrate 111 and the encapsulation substrate 141. The coupling member 151 may couple the encapsulation substrate 141 to the base substrate 111 or the circuit layer 121. The coupling member 151 may include an inorganic material or an organic material. For example, the inorganic material may include a frit seal, and the organic material may include a photo-curable resin or a photo-plastic resin. However, the material constituting the coupling member 151 is not limited to the example.

The input sensor 200a may be directly located on the encapsulation substrate 141. The expression "directly located" may mean that the third component is not interposed between the input sensor 200a and the encapsulation substrate 141. That is, a separate adhesive member may not be interposed between the input sensor 200a and the display panel 101. However, the embodiments according to the present disclosure are not limited thereto, and an adhesive layer may be further interposed between the input sensor 200a and the encapsulation substrate 141.

Figure 5:
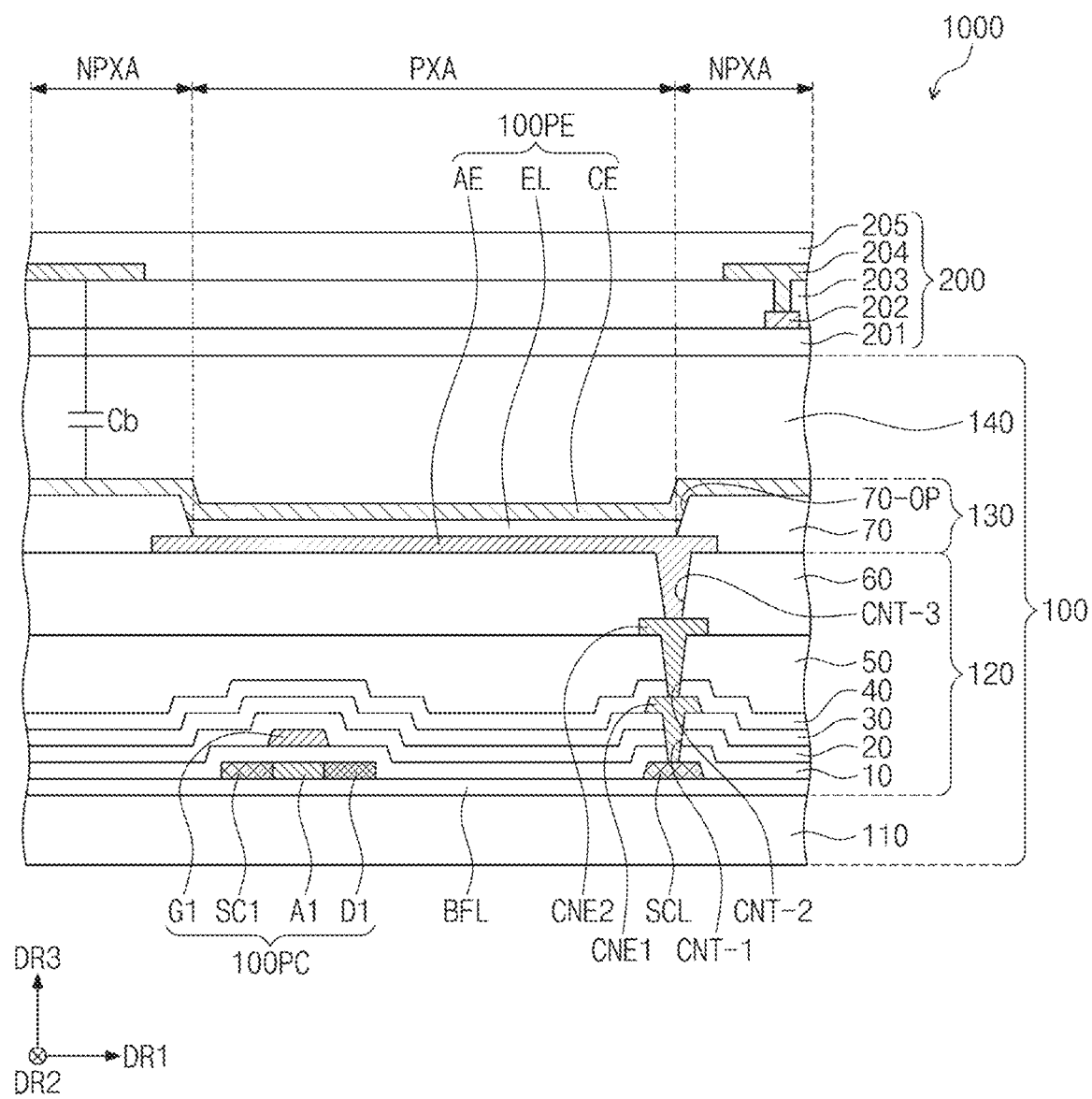
FIG. 5 is a cross-sectional view of a display device, according to some embodiments of the present disclosure.

FIG. 5 is a cross-sectional view of an electronic device, according to some embodiments of the present disclosure. In the description of FIG. 5, the same reference numerals are assigned to the same components described with reference to FIG. 4A, and thus the descriptions thereof are omitted to avoid redundancy.

Referring to FIG. 5, at least one inorganic layer may be formed on the upper surface of the base layer 110. The inorganic layer may include at least one of aluminum oxide, titanium oxide, silicon oxide, silicon oxynitride, silicon nitride, zirconium oxide, or hafnium oxide. The inorganic layer may be formed of multiple layers. The multiple inorganic layers may constitute a barrier layer and/or a buffer layer. According to some embodiments, it is illustrated that the display panel 100 includes a buffer layer BFL.

The buffer layer BFL may improve a bonding force between the base layer 110 and a semiconductor pattern. The buffer layer BFL may include a silicon oxide layer and a silicon nitride layer. The silicon oxide layer and the silicon nitride layer may be stacked alternately.

The semiconductor pattern may be located on the buffer layer BFL. The semiconductor pattern may include polysilicon. However, embodiments according to the present disclosure are not limited thereto, and the semiconductor pattern may include amorphous silicon, low-temperature polycrystalline silicon, or an oxide semiconductor.

FIG. 5 only illustrates a part of the semiconductor pattern, and the semiconductor pattern may be further located in another area. The semiconductor pattern may be arranged in a specific rule throughout pixels. The semiconductor pattern may have electrical characteristics different depending on whether the semiconductor pattern is doped. The semiconductor pattern may include a first area having high conductivity and a second area having low conductivity. The first area may be doped with an N-type dopant or a P-type dopant. The P-type transistor may include the doped area doped with a P-type dopant, and the N-type transistor may include the doped area doped with an N-type dopant. The second area may be an undoped area or may be doped with a lower concentration than the first area.

The conductivity of the first area is greater than that of the second area. The first area may substantially operate as an electrode or signal line. The second area may correspond to a channel area of a transistor substantially. In other words, a part of the semiconductor pattern may be a channel part of the transistor. Another part thereof may be a source or drain of the transistor. Another part may be a connection electrode or a connection signal line.

Each of the pixels may have an equivalent circuit including seven transistors, one capacitor, and a light emitting element. The equivalent circuit of a pixel may be modified in various shapes. One transistor 100PC and one light emitting element 100PE included in a pixel are illustrated in FIG. 5 by way of example.

The transistor 100PC may include a source part SC1, a channel part A1, a drain part D1, and a gate G1. The source part SC1, the channel part A1, and the drain part D1 may be formed from the semiconductor pattern. The source part SC1 and the drain part D1 may extend in directions opposite to each other from the channel part A1 on a cross section. A part of a connection signal line SCL formed from the semiconductor pattern is illustrated in FIG. 5. According to some embodiments, the connection signal line SCL may be electrically connected to the drain part D1 of the transistor 100PC on a plane.

A first insulating layer 10 may be located on the buffer layer BFL. The first insulating layer 10 may overlap a plurality of pixels in common and may cover the semiconductor pattern. The first insulating layer 10 may be an inorganic layer and/or an organic layer, and may have a single-layer structure or multi-layer structure. The first insulating layer 10 may include at least one of aluminum oxide, titanium oxide, silicon oxide, silicon nitride, silicon oxynitride, zirconium oxide, or hafnium oxide. According to some embodiments, the first insulating layer 10 may be a single silicon oxide layer. Not only the first insulating layer 10 but also an insulating layer of the circuit layer 120 to be described in more detail later may be an inorganic layer and/or an organic layer, and may have a single-layer structure or a multi-layer structure. The inorganic layer may include at least one of the above-described materials (or a suitable combination thereof), but embodiments according to the present disclosure are not limited thereto.

The gate G1 is located on the first insulating layer 10. The gate G1 may be a part of a metal pattern. The gate G1 overlaps the channel part A1. In a process of doping the semiconductor pattern, the gate G1 may function as a mask.

A second insulating layer 20 is located on the first insulating layer 10 and may cover the gate G1. The second insulating layer 20 may overlap pixels in common. The second insulating layer 20 may be an inorganic layer and/or an organic layer, and may have a single-layer structure or a multi-layer structure. The second insulating layer 20 may include at least one of silicon oxide, silicon nitride, or silicon oxynitride. According to some embodiments, the second insulating layer 20 may have a multi-layer structure including a silicon oxide layer and a silicon nitride layer.

A third insulating layer 30 may be located on the second insulating layer 20. The third insulating layer 30 may have a single-layer structure or multi-layer structure. For example, the third insulating layer 30 may have a multi-layer structure including a silicon oxide layer and a silicon nitride layer.

A first connection electrode CNE1 may be located on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be located on the third insulating layer 30. The fourth insulating layer 40 may be a single silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be located on the fifth insulating layer 50 and may cover the second connection electrode CNE2. The sixth insulating layer 60 may be an organic layer.

The light emitting element layer 130 may be located on the circuit layer 120. The light emitting element layer 130 may include the light emitting element 100PE and a pixel defining layer 70. For example, the light emitting element layer 130 may include an organic light emitting material, an inorganic light emitting material, a quantum dot, a quantum rod, a micro-LED, or a nano-LED. Hereinafter, the description will be given under the condition that the light emitting element 100PE is an organic light emitting element, but embodiments according to the present disclosure are not particularly limited thereto.

The light emitting element 100PE may include a first electrode AE, a light emitting layer EL, and a second electrode CE. The first electrode AE may be located on the sixth insulating layer 60. The first electrode AE may be connected to the second connection electrode CNE2 through a contact hole CNT-3 penetrating the sixth insulating layer 60.

The pixel defining layer 70 may be located on the sixth insulating layer 60 and may cover a portion of the first electrode AE. An opening 70-OP is defined in the pixel defining layer 70. The opening 70-OP of the pixel defining layer 70 exposes at least part of the first electrode AE.

The active area 1000A (see FIG. 1) may include an emission area PXA and a non-emission area NPXA adjacent to the emission area PXA. The non-emission area NPXA may surround the emission area PXA. According to some embodiments, the emission area PXA is defined to correspond to a partial area of the first electrode AE, which is exposed by the opening 70-OP.

The light emitting layer EL may be located on the first electrode AE. The light emitting layer EL may be located in an area defined by the opening 70-OP. That is, the light emitting layer EL may be separately formed on each of pixels. In the case where light emitting layers EL are independently formed for respective pixels, each of the light emitting layers EL may emit a light of at least one of a blue color, a red color, or a green color. However, embodiments according to the present disclosure are not limited thereto. For example, the light emitting layer EL may be connected and provided to each of the pixels in common. In this case, the light emitting layer EL may provide blue light or white light.

The second electrode CE may be located on the light emitting layer EL. The second electrode CE may be located in a plurality of pixels in common while having an integral shape.

According to some embodiments, a hole control layer may be interposed between the first electrode AE and the light emitting layer EL. The hole control layer may be arranged in common in the emission area PXA and the non-emission area NPXA. The hole control layer may include a hole transport layer and may further include a hole injection layer. An electron control layer may be interposed between the light emitting layer EL and the second electrode CE. The electron control layer may include an electron transport layer, and may further include an electron injection layer. The hole control layer and the electron control layer may be formed in common in a plurality of pixels by using an open mask.

The encapsulation layer 140 may be located on the light emitting element layer 130. The encapsulation layer 140 may include an inorganic layer, an organic layer, and an inorganic layer sequentially stacked, and layers constituting the encapsulation layer 140 are not limited thereto.

The inorganic layers may protect the light emitting element layer 130 from moisture and oxygen, and the organic layer may protect the light emitting element layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include an acrylate-based organic layer, but is not limited thereto.

The input sensor 200 may be formed on the display panel 100 through continuous processes. That is, a separate adhesive member may not be interposed between the input sensor 200 and the display panel 100. Alternatively, the input sensor 200 may be coupled to the display panel 100 through the adhesive member. The adhesive member may include a typical adhesive or a sticking agent.

The input sensor 200 may include a base insulating layer 201, a first conductive layer 202, a detection insulating layer 203, a second conductive layer 204, and a cover insulating layer 205.

The base insulating layer 201 may be an inorganic layer including at least one of silicon nitride, silicon oxynitride, or silicon oxide. Alternatively, the base insulating layer 201 may be an organic layer including an epoxy resin, an acrylate resin, or an imide-based resin. The base insulating layer 201 may have a single-layer structure or may have a multi-layer structure stacked in the third direction DR3.

Each of the first conductive layer 202 and the second conductive layer 204 may have a single-layer structure or may have a multi-layer structure stacked in the third direction DR3.

A conductive layer of a single-layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), indium zinc tin oxide (IZTO), or the like. Besides, the transparent conductive layer may include a conductive polymer such as PEDOT, a metal nano wire, graphene, and the like.

A conductive layer of the multi-layer structure may include metal layers. For example, the metal layers may have a three-layer structure of titanium/aluminum/titanium. The conductive layer of the multi-layer structure may include at least one metal layer and at least one transparent conductive layer.

At least one of the detection insulating layer 203 or the cover insulating layer 205 may include an inorganic layer. The inorganic layer may include at least one of aluminum oxide, titanium oxide, silicon oxide, silicon nitride, silicon oxynitride, zirconium oxide, or hafnium oxide.

At least one of the detection insulating layer 203 or the cover insulating layer 205 may include an organic layer. The organic layer may include at least one of acrylate-based resin, methacrylate-based resin, polyisoprene-based resin, vinyl-based resin, epoxy-based resin, urethane-based resin, cellulose-based resin, siloxane-based resin, polyimide-based resin, polyimide-based resin, or perylene-based resin.

A parasitic capacitance Cb may be generated between the input sensor 200 and the second electrode CE. As a distance between the input sensor 200 and the second electrode CE increases, a value of the parasitic capacitance Cb may increase. As the parasitic capacitance Cb increases, a ratio of an amount of change in capacitance to a reference value may decrease. The amount of change in capacitance may mean a change in capacitance that occurs before and after an input by an input means, for example, the input device 2000 (see FIG. 3) or a user's body 3000 (see FIG. 3).

The sensor controller 200C (see FIG. 3) that processes a signal detected from the input sensor 200 may perform a leveling operation of removing a value corresponding to the parasitic capacitance Cb from the detected signal. The ratio of the amount of change in capacitance to the reference value is increased by the leveling operation, thereby improving sensing sensitivity.

Figure 6:
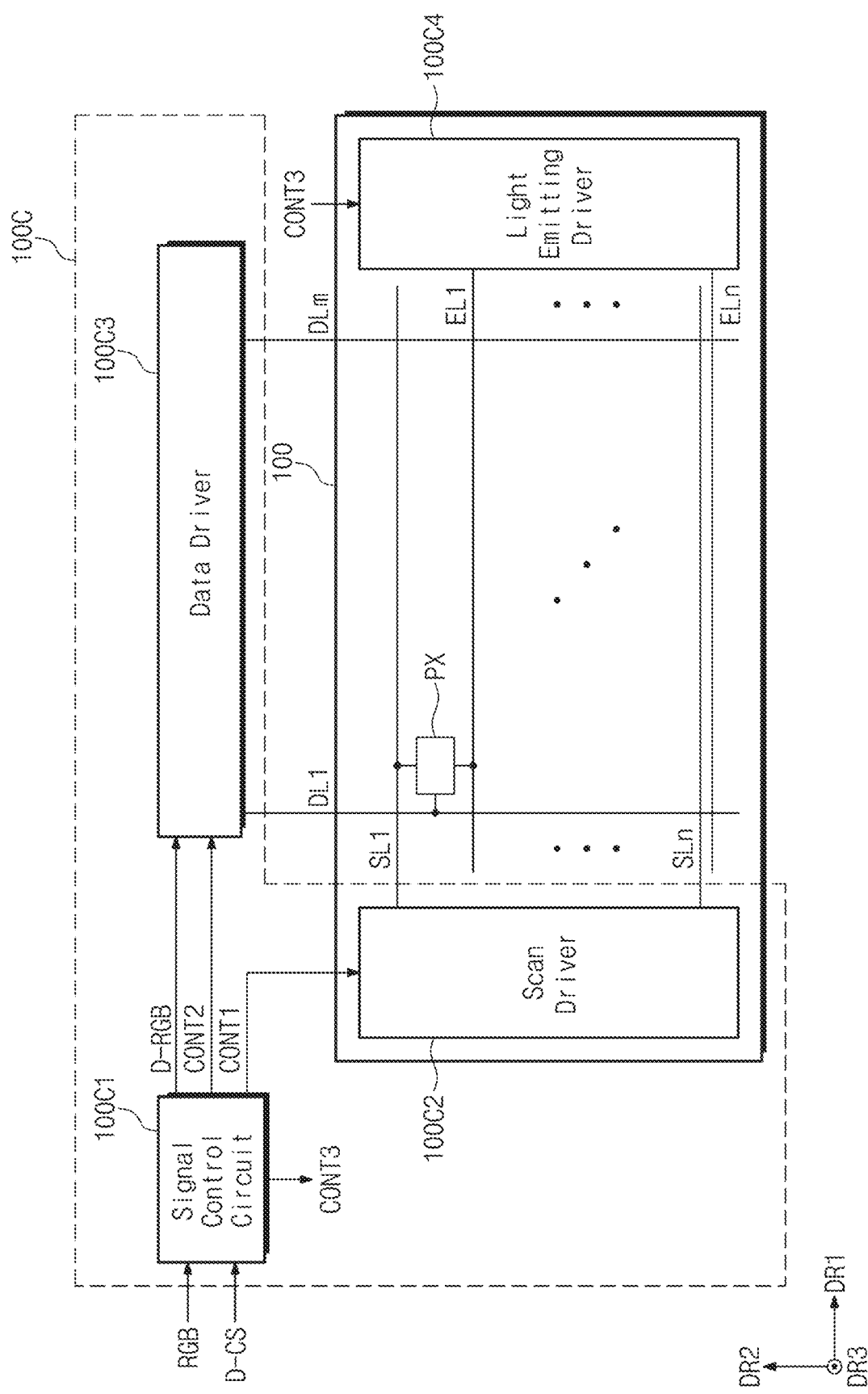
FIG. 6 is a block diagram of a display panel and a panel driver, according to some embodiments of the present disclosure.

FIG. 6 is a block diagram of a display panel and a panel driver, according to some embodiments of the present disclosure.

Referring to FIG. 6, the display panel 100 may include a plurality of scan wires SL1 to SLn, a plurality of data wires DL1 to DLm, a plurality of emission control wires EL1 to ELn, and a plurality of pixels PX. Each of the plurality of pixels PX may be connected to the corresponding data wire among the plurality of data wires DL1 to DLm, may be connected to the corresponding scan wire among the plurality of scan wires SL1 to SLn, and may be connected to the corresponding emission control wire among the plurality of emission control wires EL1 to ELn.

The panel driver 100C may include a signal control circuit 100C1, a scan driver 100C2, a data driver 100C3, and a light emitting driver 100C4.

The signal control circuit 100C1 may receive image signals RGB and first control signals D-CS from the main controller 1000C (see FIG. 3). The first control signals D-CS may include various signals. For example, the first control signals D-CS may include a vertical synchronization signal, a horizontal synchronization signal, a main clock, and a data enable signal.

The signal control circuit 100C1 generates a scan control signal CONT1, a data control signal CONT2, and an emission control signal CONT3 based on the first control signals D-CS. The signal control circuit 100C1 may provide the scan control signal CONT1 to the scan driver 100C2, may provide the data control signal CONT2 to the data driver 100C3, and may provide the emission control signal CONT3 to the light emitting driver 100C4. Moreover, the signal control circuit 100C1 may output, to the data driver 100C3, image data D-RGB obtained by processing the image signals RGB to match the operating condition of the display panel 100.

The scan driver 100C2 may drive the plurality of scan wires SL1 to SLn in response to the scan control signal CONT1. According to some embodiments of the present disclosure, the scan driver 100C2 may be formed in the same process as the circuit layer 120 (see FIG. 5) in the display panel 100, but is not limited thereto. For example, after being implemented as an integrated circuit (IC), the scan driver 100C2 may be directly mounted in an area (e.g., a set or predetermined area) of the display panel 100 or may be mounted on a separate printed circuit board in a chip on film (COF) scheme, and then may be electrically connected to the display panel 100.

The data driver 100C3 may output data signals for driving the plurality of data wires DL1 to DLm in response to the data control signal CONT2 and the image data D-RGB from the signal control circuit 100C1. After being implemented with the IC, the data driver 100C3 may be directly mounted in an area (e.g., a set or predetermined area) of the display panel 100 or may be mounted on a separate printed circuit board in the COF scheme, and then may be electrically connected to the display panel 100, but is not particularly limited thereto. For example, the data driver 100C3 may be formed in the same process as the circuit layer 120 in the display panel 100.

The light emitting driver 100C4 may drive the plurality of emission control wires EL1 to ELn in response to the emission control signal CONT3. According to some embodiments of the present disclosure, the light emitting driver 100C4 may be formed in the same process as the circuit layer 120 in the display panel 100, but is not limited thereto. For example, after being implemented with the IC, the light emitting driver 100C4 may be directly mounted in an area (e.g., a set or predetermined area) of the display panel 100 or may be mounted on a separate printed circuit board in the COF scheme, and then may be electrically connected to the display panel 100.

According to some embodiments of the present disclosure, the light emitting driver 100C4 has a configuration independent of the scan driver 100C2, but the present disclosure is not limited thereto. For example, the scan driver 100C2 and the light emitting driver 100C4 may be integrated with one integrated circuit.

Figure 7:
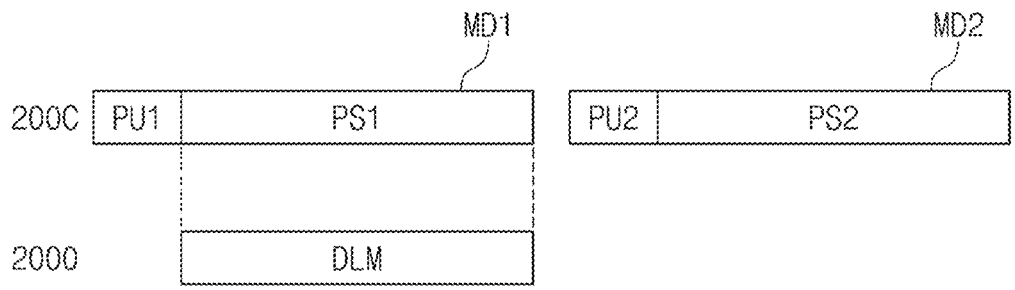
FIG. 7 is a conceptual diagram illustrating operations of a first mode and a second mode, according to some embodiments of the present disclosure.

FIG. 7 is a conceptual diagram illustrating operations of a first mode and a second mode, according to some embodiments of the present disclosure.

Referring to FIGS. 3 and 7, the sensor controller 200C may operate in a first mode MD1 for detecting a first input by the input device 2000 or in a second mode MD2 for detecting a second input by the user's body 3000.

The first mode MD1 may include a first section PU1 and a second section PS1. The second section PS1 may proceed after the first section PU1. The first section PU1 may be an uplink section in which the uplink signal ULS is capable of being transmitted to the input sensor 200. The second section PS1 may be a downlink section DLM in which the downlink signal DLS provided from the input device 2000 is capable of being received through the input sensor 200. The input sensor 200 may detect the first input of the input device 2000 based on the downlink signal DLS.

The input device 2000 may provide the downlink signal DLS to the sensor controller 200C during the downlink section DLM.

The sensor controller 200C may operate in the second mode MD2 after the first mode MD1 is terminated. The first mode MD1 and the second mode MD2 may be repeated alternatively.

The second mode MD2 may include a first section PU2 and a second section PS2. The second section PS2 may proceed after the first section PU2. The first section PU2 may be an uplink section in which the uplink signal ULS is capable of being transmitted to the input sensor 200. The second section PS2 may be a section in which the sensor controller 200C detects the second input by the user's body 3000.

The input device 2000 may provide the input sensor 200 with a response signal to the uplink signal ULS. When receiving the response signal detected by the input sensor 200 in the first section PU1 or PU2, the sensor controller 200C may operate in the second section PS1 of the first mode MD1. When not receiving the response signal from the input device 2000 in the first section PU2, the sensor controller 200C may operate in the second section PS2 of the second mode MD2. Accordingly, the input sensor 200 may periodically monitor whether the input device 2000 is detected, and may easily detect the first input by the input device 2000. However, this is an example and the operation of the sensor controller 200C is not particularly limited thereto.

Figure 8:
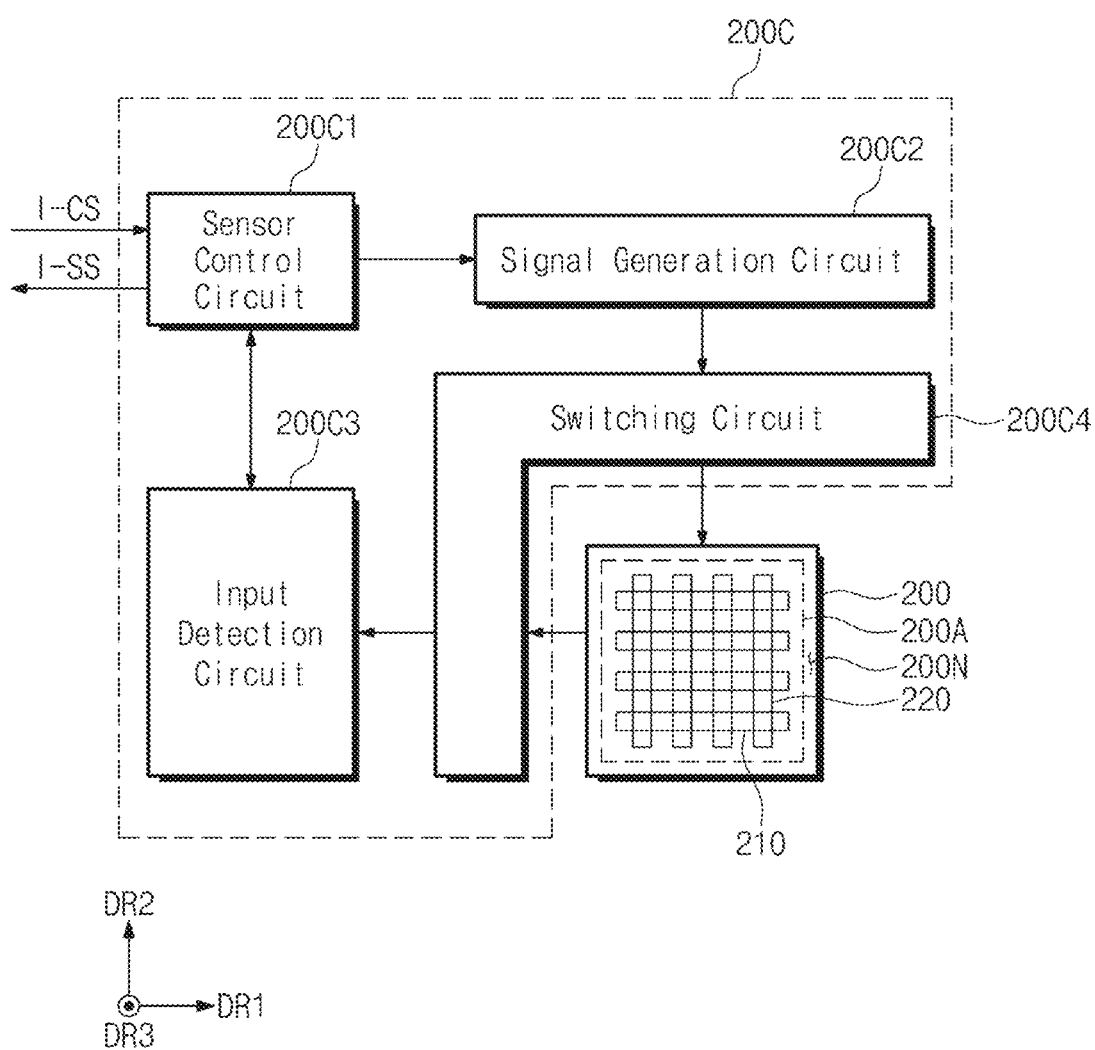
FIG. 8 is a block diagram of an input sensor and a sensor controller, according to some embodiments of the present disclosure.

FIG. 8 is a block diagram of an input sensor and a sensor controller, according to some embodiments of the present disclosure.

Referring to FIG. 8, a sensing area 200A and a non-sensing area 200N may be defined in the input sensor 200. The sensing area 200A may be an area activated depending on an electrical signal. For example, the sensing area 200A may be an area for detecting an input. The sensing area 200A may overlap the active area 1000A (see FIG. 1) of the display device 1000 (see FIG. 1). The non-sensing area 200N may surround the sensing area 200A. The non-sensing area 200N may overlap the peripheral area 1000NA (see FIG. 1) of the display device 1000 (see FIG. 1).

The input sensor 200 may include a plurality of first sensing electrodes 210 and a plurality of second sensing electrodes 220. Each of the plurality of first sensing electrodes 210 may extend in the first direction DR1. The plurality of first sensing electrodes 210 may be arranged spaced from each other in the second direction DR2. Each of the plurality of second sensing electrodes 220 may extend in the second direction DR2. The plurality of second sensing electrodes 220 may be arranged spaced from each other in the first direction DR1.

The plurality of second sensing electrodes 220 may be intersected with the plurality of first sensing electrodes 210 to be insulated from each other. Each of the plurality of first sensing electrodes 210 may have a bar shape or a stripe shape, and each of the plurality of second sensing electrodes 220 may have a bar shape or a stripe shape. The plurality of first sensing electrodes 210 and the plurality of second sensing electrodes 220 having such the shape may improve sensing characteristics of a continuous linear input. However, the shape of each of the plurality of first sensing electrodes 210 and the shape of each of the plurality of second sensing electrodes 220 are not limited thereto.

The sensor controller 200C may receive the second control signal I-CS from the main controller 1000C (see FIG. 3) and may provide the coordinate signal I-SS to the main controller 1000C (see FIG. 3).

The sensor controller 200C may include a sensor control circuit 200C1, a signal generation circuit 200C2, an input detection circuit 200C3, and a switching circuit 200C4. The sensor control circuit 200C1, the signal generation circuit 200C2, and the input detection circuit 200C3 may be implemented in a single chip. Alternatively, a part of the sensor control circuit 200C1, the signal generation circuit 200C2, and the input detection circuit 200C3, and another part thereof may be implemented in different chips from each other.

The sensor control circuit 200C1 may control operations of the signal generation circuit 200C2 and the switching circuit 200C4, may calculate coordinates of an external input from a driving signal received from the input detection circuit 200C3 or analyze information transmitted by the input device 2000 (see FIG. 3) from a modulated signal received from the input detection circuit 200C3.

The signal generation circuit 200C2 may provide the input sensor 200 with an output signal referred to as a "transmission signal". The signal generation circuit 200C2 may output an output signal, which is suitable for an operating mode, to the input sensor 200.

The input detection circuit 200C3 may convert an analog reception signal (or a detection signal) received from the input sensor 200 into a digital reception signal. The input detection circuit 200C3 may amplify the analog reception signal and then may filter the amplified reception signal. Afterward, the input detection circuit 200C3 may convert the filtered reception signal into a digital reception signal.

Under the control of the sensor control circuit 200C1, the switching circuit 200C4 may selectively control an electrical connection relationship between the input sensor 200 and the signal generation circuit 200C2 and/or the input detection circuit 200C3. Under the control of the sensor control circuit 200C1, the switching circuit 200C4 may connect one group among the plurality of first sensing electrodes 210 and the plurality of second sensing electrodes 220 to the signal generation circuit 200C2 or may connect the plurality of first sensing electrodes 210 and the plurality of second sensing electrodes 220 to the signal generation circuit 200C2. Alternatively, the switching circuit 200C4 may connect one group among the plurality of first sensing electrodes 210 and the plurality of second sensing electrodes 220 or all of the plurality of first sensing electrodes 210 and the plurality of second sensing electrodes 220 to the input detection circuit 200C3.

Figure 9A:
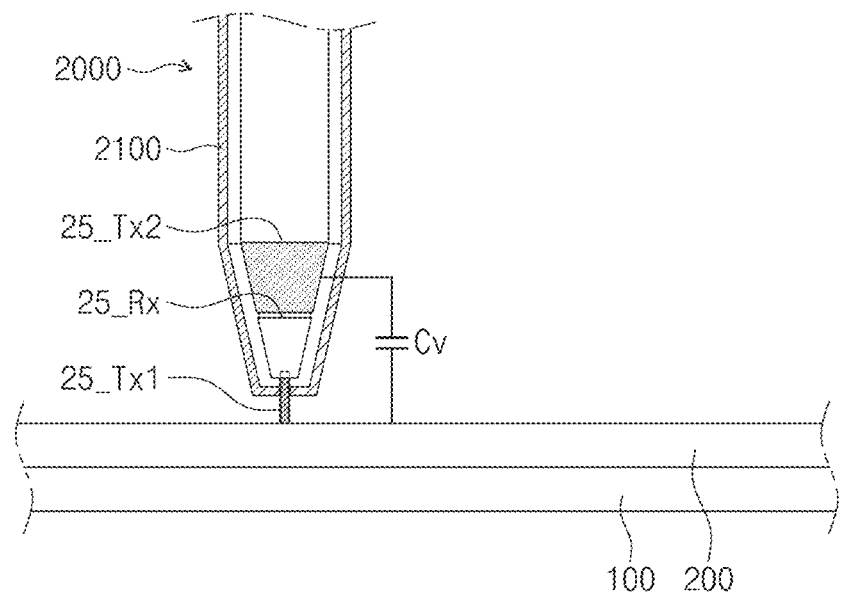
FIGS. 9A and 9B are diagrams illustrating a structure of an input device, according to some embodiments of the present disclosure.
Figure 9B:
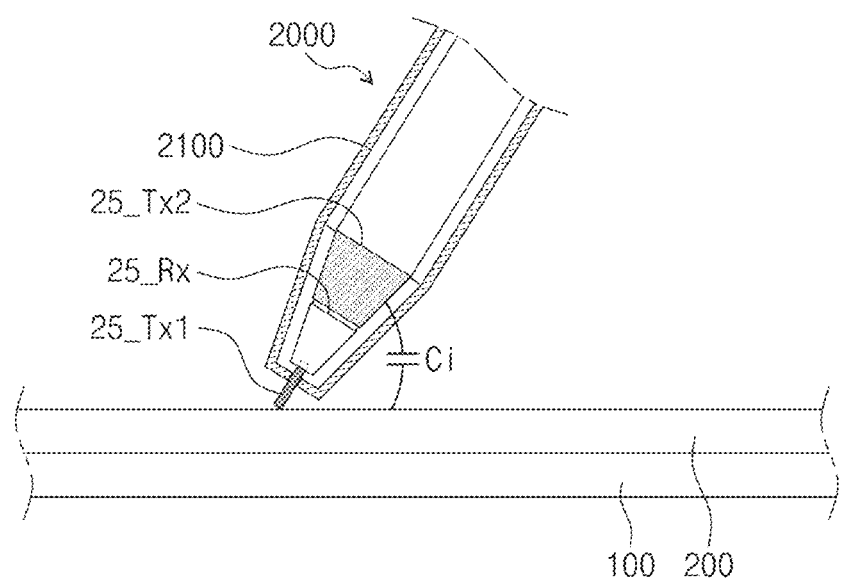

FIGS. 9A and 9B are diagrams illustrating a structure of an input device, according to embodiments of the present disclosure.

Referring to FIG. 9A, the input device 2000 includes the tip electrode 25_Tx1, the reception electrode 25_Rx, and the transmission electrode 25_Tx2. The tip electrode 25_Tx1 protrudes to the outside of the housing 2100 and transmits the downlink signal DLS (see FIG. 3) to the outside (e.g., the display device 1000 (see FIG. 3)). The reception electrode 25_Rx is positioned inside the housing 2100 and receives the uplink signal ULS from the outside (e.g., the display device 1000). When the input device 2000 is synchronized with the display device 1000, the input device 2000 may transmit various signals for communication to the display device 1000 by using the tip electrode 25_Tx1 and the transmission electrode 25_Tx2.

The tip electrode 25_Tx1, the reception electrode 25_Rx, and the transmission electrode 25_Tx2 may be electrically insulated from one another. The reception electrode 25_Rx may be interposed between the tip electrode 25_Tx1 and the transmission electrode 25_Tx2. However, locations of the reception electrode 25_Rx and the transmission electrode 25_Tx2 are not limited thereto. For example, the transmission electrode 25_Tx2 may be interposed between the reception electrode 25_Rx and the tip electrode 25_Tx1.

When the input device 2000 has a pen shape, at least one of the reception electrode 25_Rx or the transmission electrode 25_Tx2 may have a structure (or shape) in which a surface area is reduced toward the tip electrode 25_Tx1.

According to some embodiments of the present disclosure, the transmission electrode 25_Tx2 may be used to measure slope information of the input device 2000. For example, when the input device 2000 is inclined vertically (e.g., about 90°) with respect to the display surface of the display panel 100, first capacitance Cv may be formed between the transmission electrode 25_Tx2 and electrodes (e.g., the first sensing electrodes 210 (see FIG. 8)) of the input sensor 200. When the input device 2000 is inclined at an angle less than about 90° with respect to the display surface of the display panel 100, second capacitance Ci greater than the first capacitance Cv may be formed between the transmission electrode 25_Tx2 and the electrodes (e.g., the first sensing electrodes 210) of the input sensor 200. As an angle between the input device 2000 and the display surface of the display panel 100 decreases, the magnitude of the capacitance formed between the transmission electrode 25_Tx2 and the electrode of the input sensor 200 may increase. The display device 1000 or the input device 2000 may calculate the slope information of the input device 2000 by using the magnitude of capacitance.

FIGS. 10A to 10G are diagrams illustrating a structure of a reception electrode of an input device, according to some embodiments of the present disclosure.

Figure 10A:
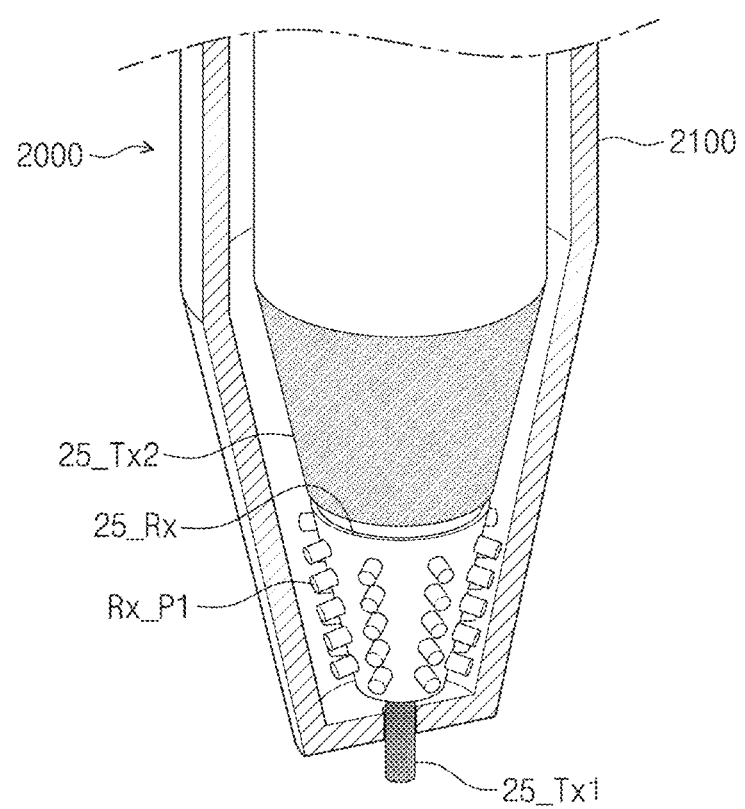
FIGS. 10A to 10G are diagrams illustrating a structure of a reception electrode of an input device, according to some embodiments of the present disclosure.
Figure 10B:
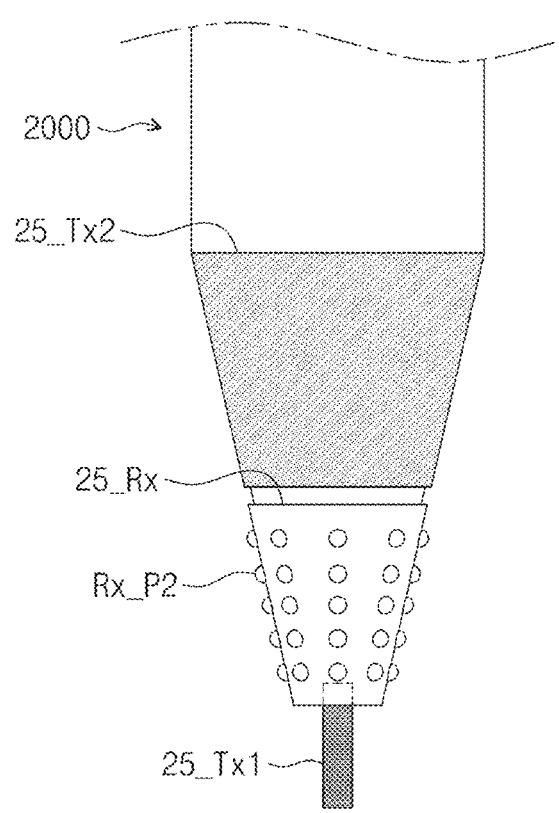
Figure 10C:
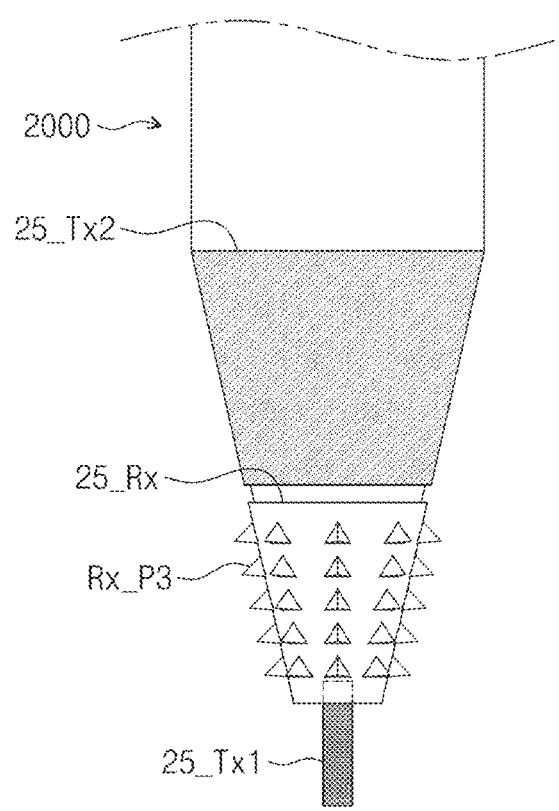

Referring to FIG. 10A, a surface of the reception electrode 25_Rx provided in the input device 2000 may have a concave-convex structure, and a surface of the transmission electrode 25_Tx2 provided in the input device 2000 may not have a concave-convex structure. According to some embodiments of the present disclosure, the reception electrode 25_Rx may include a plurality of reception protrusions Rx_P1 spaced apart from each other. The reception protrusions Rx_P1 may have the same shapes as each other. For example, each of the reception protrusions Rx_P1 may have a cylindrical shape. However, a shape of each of the reception protrusions Rx_P1 is not limited thereto. For example, according to some embodiments, as shown in FIG. 10B, each of reception protrusions Rx_P2 may have a hemispherical shape. As shown in FIG. 10C, each of reception protrusions Rx_P3 may have a shape of a polygonal column (e.g., a triangular or pyramidal column).

Figure 10D:
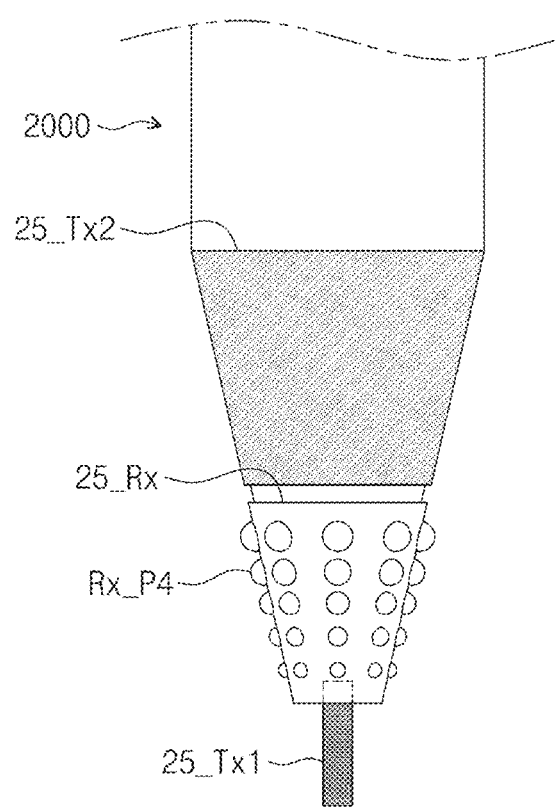

As shown in FIGS. 10A to 10C, the reception protrusions Rx_P1, Rx_P2, and Rx_P3 have the same sizes as each other. However, the embodiments according to the present disclosure are not limited thereto. Alternatively, the reception protrusions Rx_P1, Rx_P2, and Rx_P3 may have different sizes from one another. For example, as shown in FIG. 10D, sizes of reception protrusions Rx_P4 may decrease toward the tip electrode 25_Tx1. For example, the reception protrusions Rx_P4 may be smallest near the tip electrode 25_Tx1, and become larger (e.g., with a larger diameter and/or a larger height/thickness, etc.) further from the tip electrode 25_Tx1.

Figure 10E:
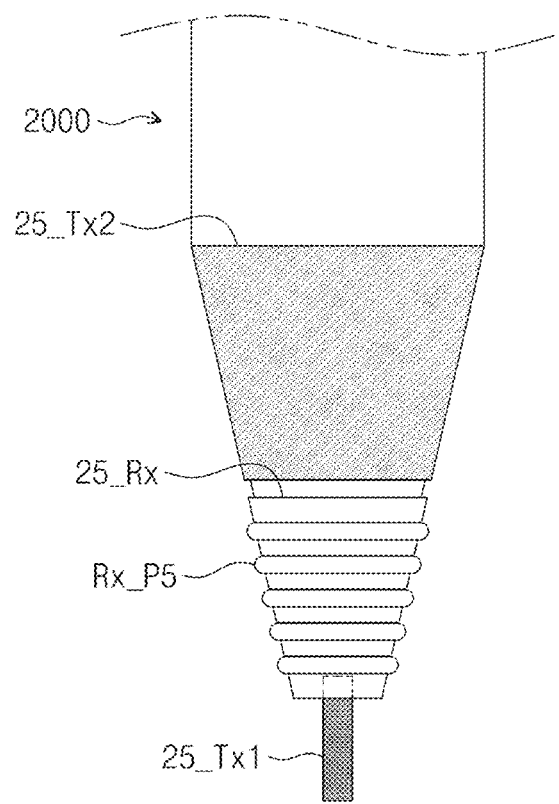
Figure 10F:
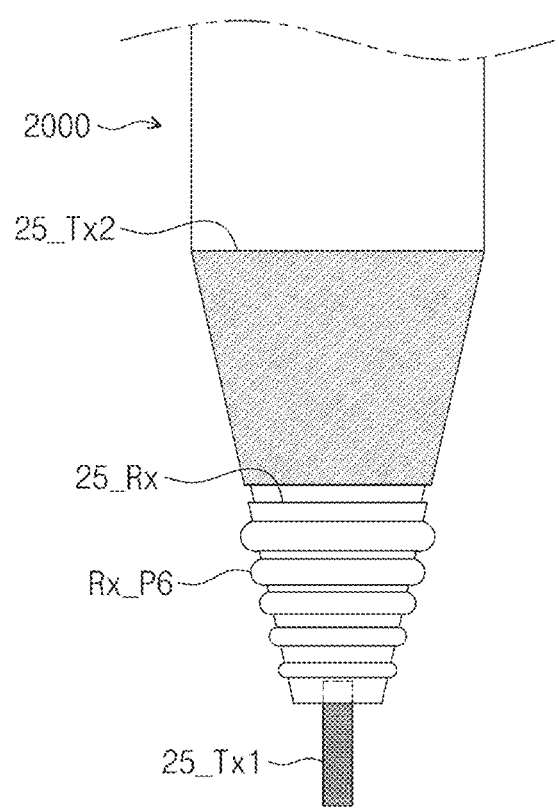

Referring to FIG. 10E, each of reception protrusions Rx_P5 may have a ring shape. In this case, lengths of the reception protrusions Rx_P5 may decrease toward the tip electrode 25_Tx1. A cross-section obtained by cutting each of the reception protrusions Rx_P5 in a width direction may have a hemispherical shape. Also, widths of the reception protrusions Rx_P5 may be the same as each other. However, the present disclosure is not limited thereto. Alternatively, the reception protrusions Rx_P5 may have different widths from one another. For example, as shown in FIG. 10F, sizes of reception protrusions Rx_P6 may decrease toward the tip electrode 25_Tx1.

Figure 10G:
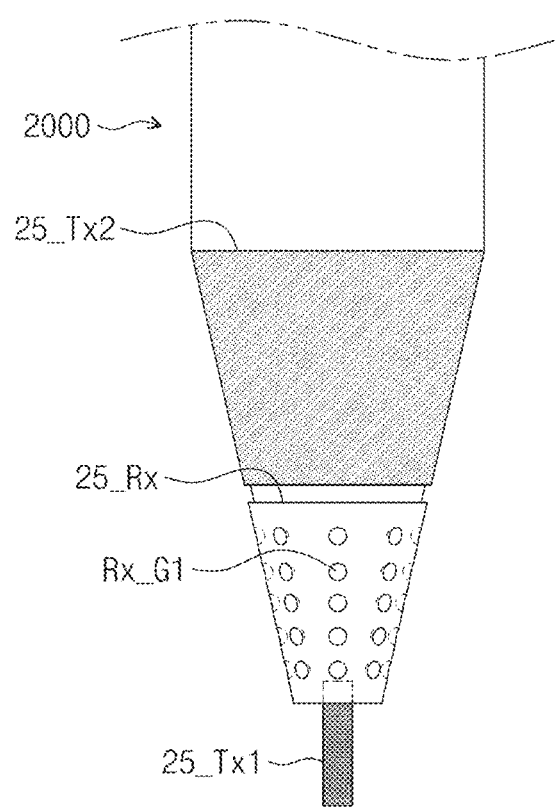

Referring to FIG. 10G, according to some embodiments of the present disclosure, the reception electrode 25_Rx may include a plurality of reception grooves Rx_G1 or holes that are spaced from one another. Each of the reception grooves Rx_G1 may have a shape (e.g., a concave shape) recessed from the surface of the reception electrode 25_Rx, and may have a shape of one of a hemisphere, a cylinder column, or a polygonal column. The reception grooves Rx_G1 have the same sizes as each other. However, the present disclosure is not limited thereto. Alternatively, the reception grooves Rx_G1 may have different sizes from each other. For example, sizes of the reception grooves Rx_G1 may decrease toward the tip electrode 25_Tx1.

Alternatively, each of the reception grooves Rx_G1 may have a ring shape. In this case, the length of each of the reception grooves Rx_G1 may decrease toward the tip electrode 25_Tx1. Also, widths of the reception grooves Rx_G1 may be the same as each other. However, the present disclosure is not limited thereto. Alternatively, the reception grooves Rx_G1 may have different widths from each other. For example, sizes of the reception grooves Rx_G1 may decrease toward the tip electrode 25_Tx1.

As such, it may be possible to increase a surface area of the reception electrode 25_Rx by forming the surface of the reception electrode 25_Rx in the concave-convex structure. As a result, the signal reception performance of the input device 2000 may be improved without increasing a length (i.e., a length of the input device 2000 in a length direction) of the reception electrode 25_Rx.

FIGS. 11A to 11F are diagrams illustrating a structure of a transmission electrode of an input device, according to some embodiments of the present disclosure.

Figure 11A:
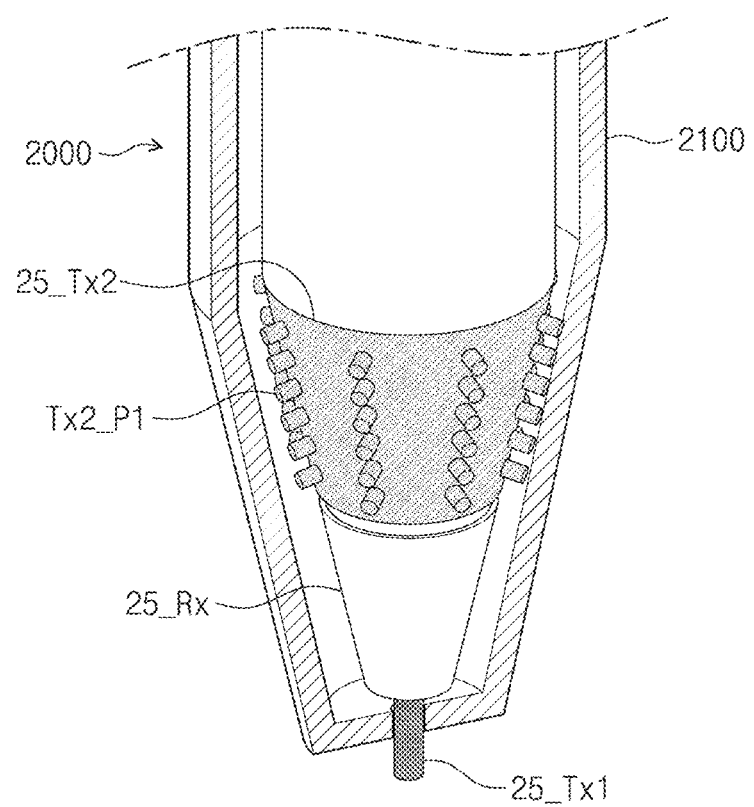
FIGS. 11A to 11F are diagrams illustrating a structure of a transmission electrode of an input device, according to some embodiments of the present disclosure.
Figure 11B:
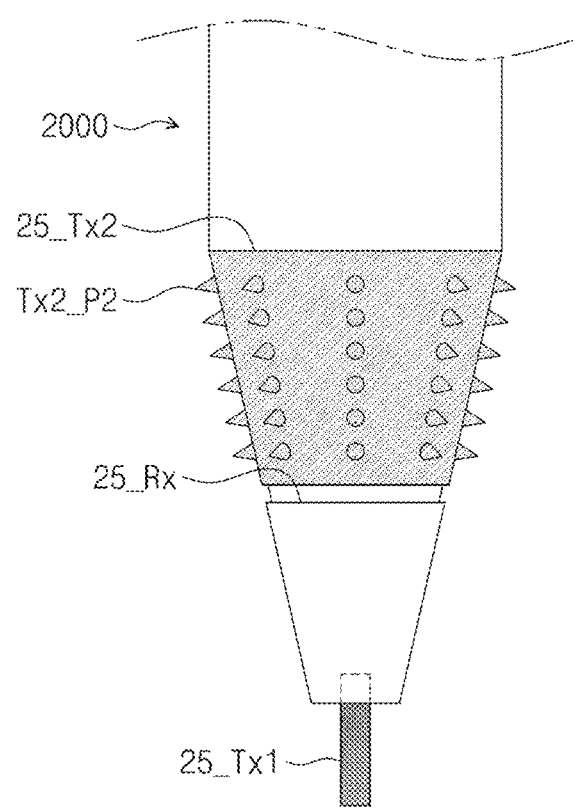
Figure 11C:
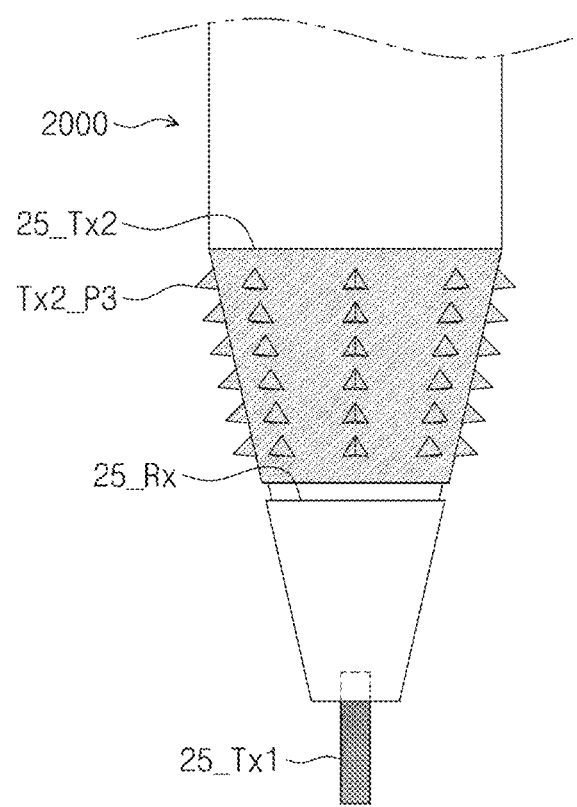

Referring to FIG. 11A, a surface of the transmission electrode 25_Tx2 provided in the input device 2000 may have a concave-convex structure, and a surface of the reception electrode 25_Rx provided in the input device 2000 may have a flat structure without having the concave-convex structure. According to some embodiments of the present disclosure, the transmission electrode 25_Tx2 may include a plurality of transmission protrusions Tx2_P1 spaced from each other. The transmission protrusions Tx2_P1 may have the same shapes as each other. For example, each of the transmission protrusions Tx2_P1 may have a cylindrical shape. However, a shape of each of the transmission protrusions Tx2_P1 is not limited thereto. Alternatively, as shown in FIG. 11B, each of transmission protrusions Tx2_P2 may have a shape of a circular cone. As shown in FIG. 11C, each of transmission protrusions Tx2_P3 may have a shape of a faceted cone (e.g., a triangular cone). When each of the transmission protrusions Tx2_P2 and Tx2_P3 has a shape of a pointed circular cone or a pointed faceted cone, the straightness of the signal transmitted through the transmission electrode 25_Tx2 may be improved.

Figure 11D:
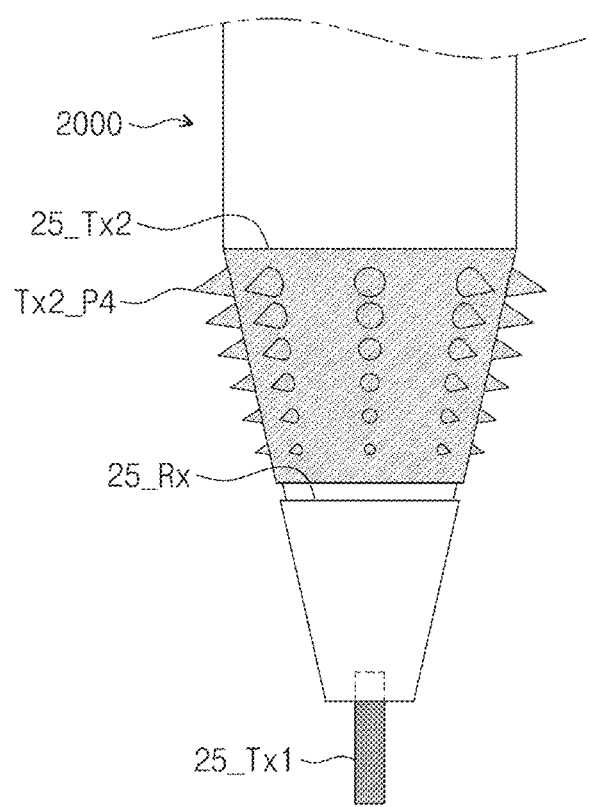

As shown in FIGS. 11A to 11C, the transmission protrusions Tx2_P1, Tx2_P2, and Tx2_P3 have the same sizes as each other. However, the present disclosure is not limited thereto. Alternatively, the transmission protrusions Tx2_P1, Tx2_P2, and Tx2_P3 may have different sizes from one another. For example, as shown in FIG. 11D, sizes of transmission protrusions Tx2_P4 may decrease toward the tip electrode 25_Tx1.

Figure 11E:
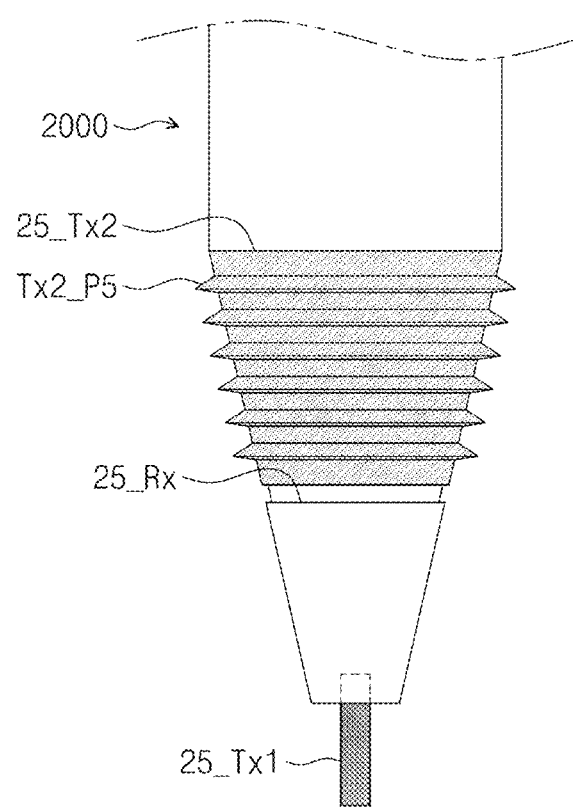
Figure 11F:
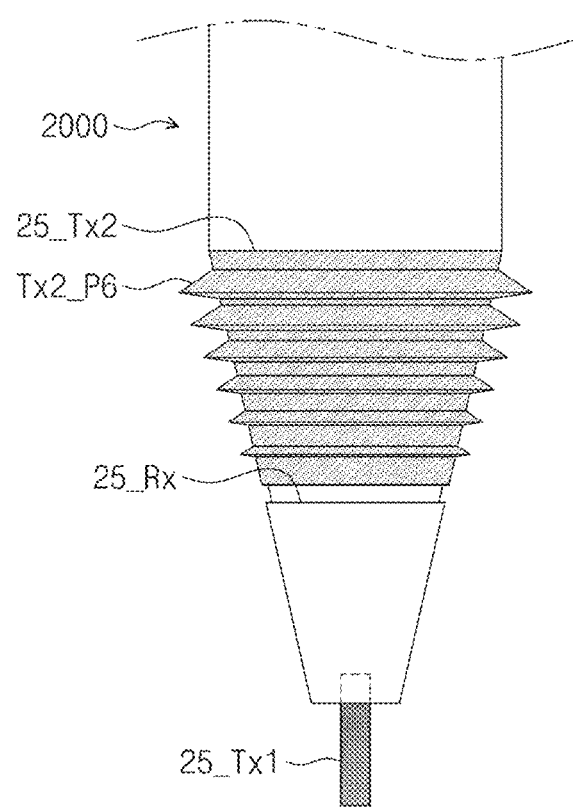

Referring to FIG. 11E, each of reception protrusions Tx2_P5 may have a ring shape. In this case, lengths of the transmission protrusions Tx2_P5 may decrease toward the tip electrode 25_Tx1. A cross-section obtained by cutting each of the transmission protrusions Tx2_P5 in a width direction may have a triangular shape. Also, widths of the transmission protrusions Tx2_P5 may be the same as each other. However, the present disclosure is not limited thereto. Alternatively, the transmission protrusions Tx2_P5 may have different widths from one another. For example, as shown in FIG. 11F, sizes of transmission protrusions Tx2_P6 may decrease toward the tip electrode 25_Tx1.

As such, it may be possible to increase a surface area of the transmission electrode 25_Tx2 by forming the surface of the transmission electrode 25_Tx2 in the concave-convex structure. As a result, the signal transmission performance of the input device 2000 may be improved without increasing a length (i.e., a length of the input device 2000 in a length direction) of the transmission electrode 25_Tx2.

Figure 12A:
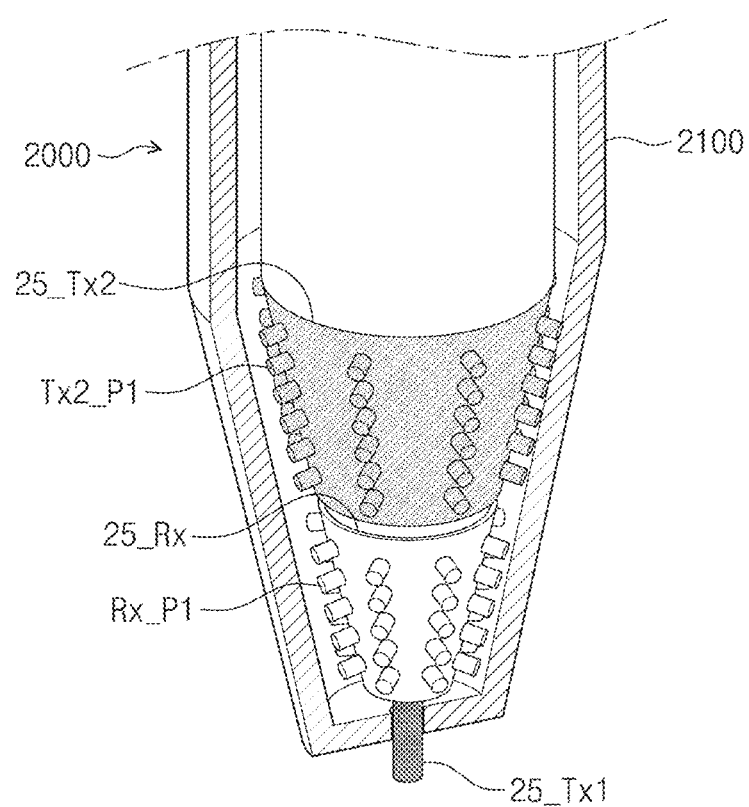
FIGS. 12A to 12C are diagrams illustrating structures of a reception electrode and a transmission electrode of an input device, according to some embodiments of the present disclosure.
Figure 12B:
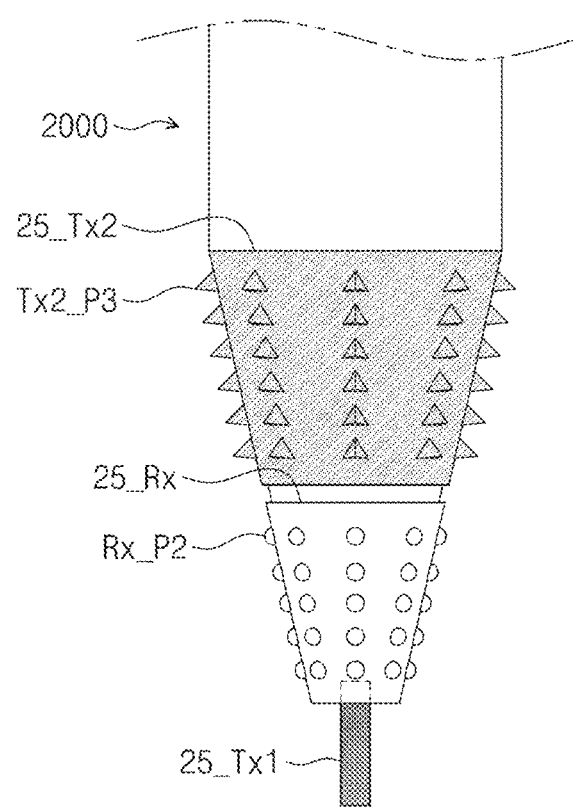
Figure 12C:
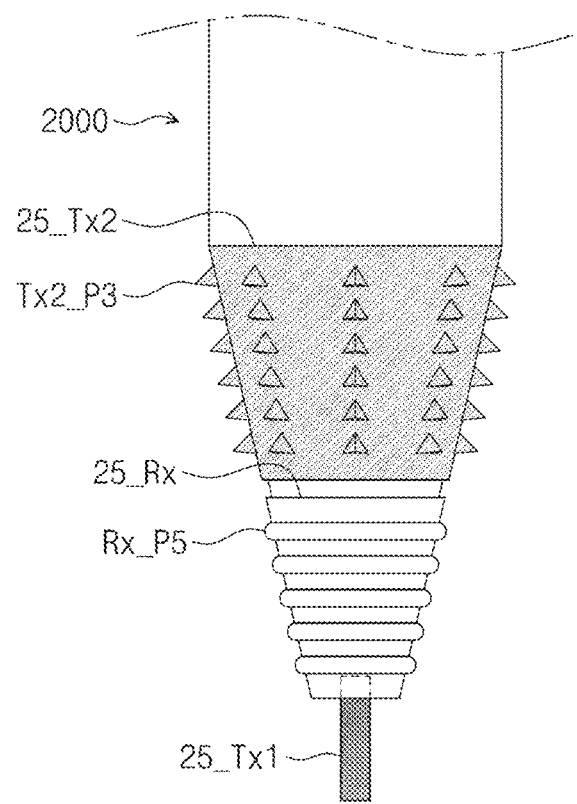

FIGS. 12A to 12C are diagrams illustrating structures of a reception electrode and a transmission electrode of an input device, according to some embodiments of the present disclosure.

Referring to FIG. 12A, a surface of the reception electrode 25_Rx provided in the input device 2000 may have a concave-convex structure, and a surface of the transmission electrode 25_Tx2 provided therein may have a concave-convex structure. As an example of some embodiments the present disclosure, the reception electrode 25_Rx may include the plurality of reception protrusions Rx_P1 spaced from each other, and the transmission electrode 25_Tx2 may include the plurality of transmission protrusions Tx2_P1 spaced from each other.

As an example of the present disclosure, the plurality of reception protrusions Rx_P1 and the plurality of transmission protrusions Tx2_P1 may have the same shape as each other. For example, each of the plurality of reception protrusions Rx_P1 may have a shape of a cylinder column, a hemisphere, or a polygonal column, and each of the plurality of transmission protrusions Tx2_P1 may have a shape of a cylinder column, a hemisphere, or a polygonal column. However, embodiments according to the present disclosure are not limited thereto. Alternatively, the plurality of reception protrusions Rx_P1 and the plurality of transmission protrusions Tx2_P1 may have shapes different from one another. As illustrated in FIG. 12B, each of the reception protrusions Rx_P2 may have a shape of a hemisphere, and each of the transmission protrusions Tx2_P3 may have a shape of a triangular cone.

Alternatively, as shown in FIG. 12C, each of the reception protrusions Rx_P5 may have a ring shape. A cross-section obtained by cutting each of the reception protrusions Rx_P5 in a width direction may have a hemisphere shape. Each of the transmission protrusions Tx2_P5 may have a ring shape. A cross-section obtained by cutting each of the transmission protrusions Tx2_P5 in a width direction may have a triangular shape.

As such, the surface area of the reception electrode 25_Rx and the surface area of the transmission electrode 25_Tx2 may be increased by forming a surface of each of the reception electrode 25_Rx and a surface of each of the transmission electrode 25_Tx2 of the input device 2000 in a concave-convex structure. As a result, the signal transmission performance and signal reception performance of the input device 2000 may be improved at the same time.

FIGS. 13A to 13D are diagrams illustrating a structure of an internal electrode of an input device, according to embodiments of the present disclosure.

Figure 13A:
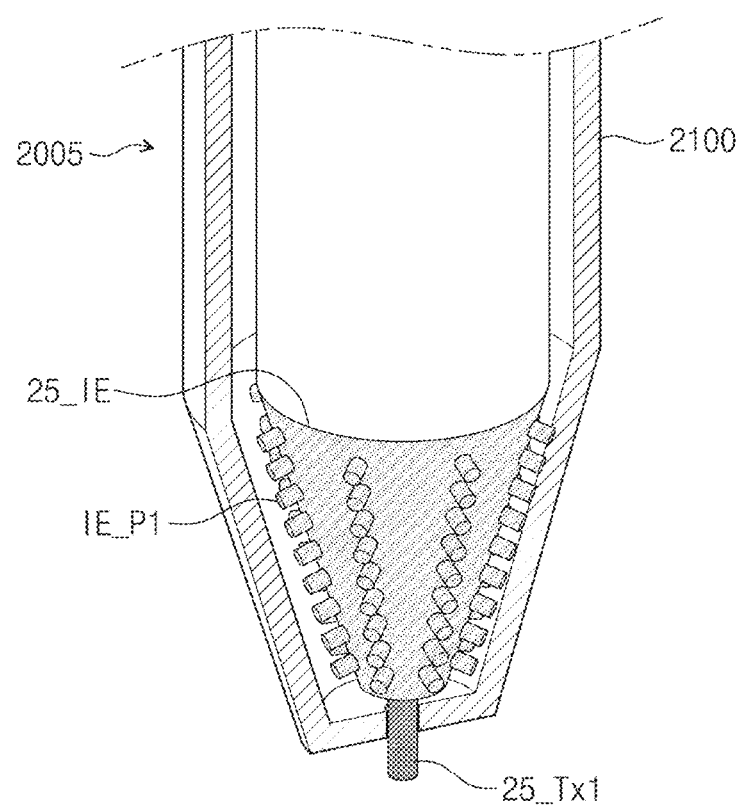
FIGS. 13A to 13D are diagrams illustrating a structure of an internal electrode of an input device, according to some embodiments of the present disclosure.

Referring to FIG. 13A, an input device 2005 includes the tip electrode 25_Tx1 and an internal electrode 25_IE. The tip electrode 25_Tx1 protrudes to the outside of the housing 2100 and transmits the downlink signal DLS (see FIG. 3) to the outside (e.g., the display device 1000 (see FIG. 3)). The internal electrode 25_IE may be positioned inside the housing 2100 and may receive the uplink signal ULS from the outside (e.g., the display device 1000) or transmit various signals for communication to the display device 1000. That is, the internal electrode 25_IE may be an electrode for transmitting and receiving signals.

The tip electrode 25_Tx1 and the internal electrode 25_IE may be electrically insulated from each other. When the input device 2005 has a pen shape, the internal electrode 25_IE may have a structure (or shape) in which a surface area is reduced toward the tip electrode 25_Tx1. According to some embodiments of the present disclosure, the t internal electrode 25_IE may be used to calculate slope information of the input device 2005.

The surface of the internal electrode 25_IE provided in the input device 2005 may have a concave-convex structure. As an example of the present disclosure, the internal electrode 25_IE may include a plurality of protrusions IE_P1 spaced from each other.

Figure 13B:
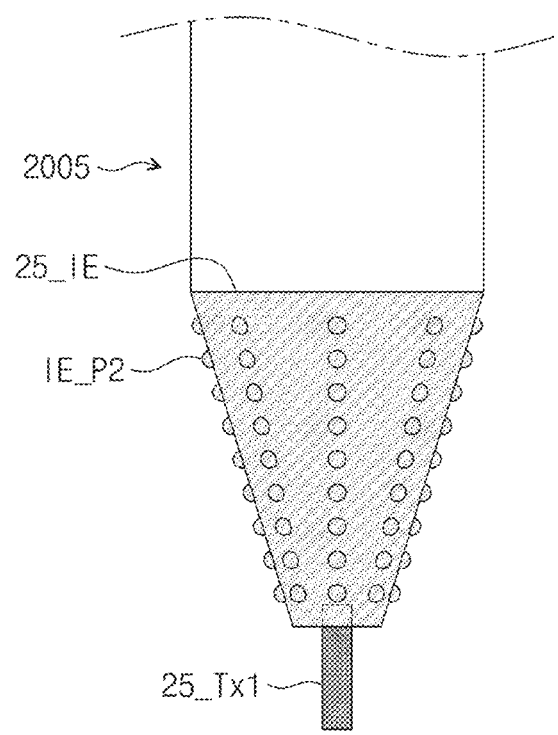
Figure 13C:
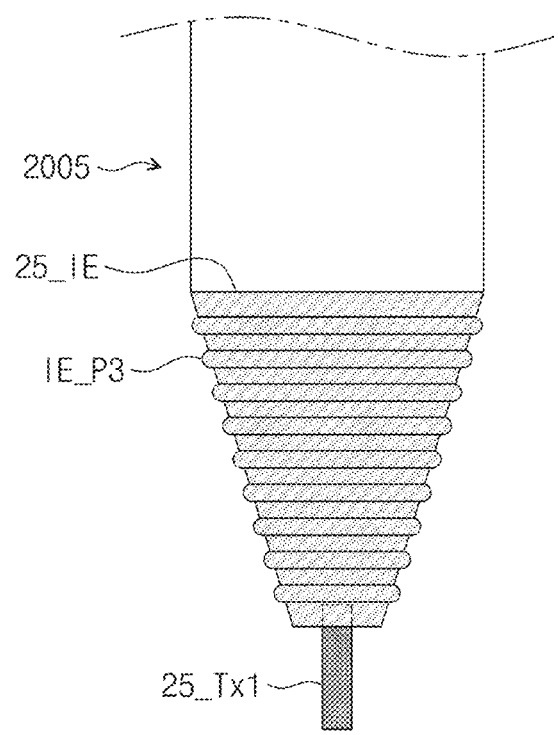

As an example of the present disclosure, the protrusions IE_P1 may have the same shapes as each other. For example, each of the protrusions IE_P1 may have a cylindrical shape. A shape of each of the protrusions IE_P1 is not limited thereto. Alternatively, as shown in FIG. 13B, each of the protrusions IE_P2 may have a hemisphere shape. Also, as shown in FIG. 13C, each of the protrusions IE_P3 may have a ring shape. A cross-section obtained by cutting each of the transmission protrusions IE_P3 in a width direction may have a hemisphere or a triangular shape.

As such, the surface area of the internal electrode 25_IE may be increased by forming the surface of the internal electrode 25_IE of the input device 2000 in the concave-convex structure. As a result, the signal transmission performance and signal reception performance of the input device 2005 may be improved at the same time.

Figure 13D:
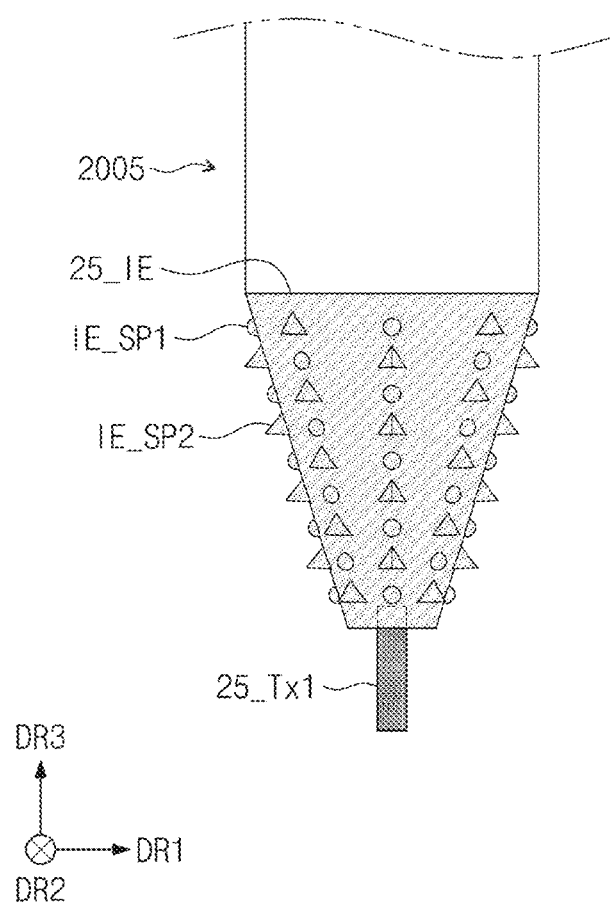

Alternatively, the protrusions IE_P1, IE_P2 or IE_P3 may have different shapes from one another. As shown in FIG. 13D, the internal electrode 25_IE may include a plurality of first protrusions IE_SP1 having a first shape and a plurality of second protrusions IE_SP2 having a second shape. As an example of the present disclosure, each of the first protrusions IE_SP1 may have a shape of a cylinder column, a hemisphere, or a polygonal column, and each of the second protrusions IE_SP2 may have a shape of a circular cone or a faceted cone. As each of the second protrusions IE_SP2 has a shape of a circular cone or faceted cone, the straightness of a signal transmitted through the internal electrode 25_IE may be improved.

According to some embodiments of the present disclosure, the first and second protrusions IE_SP1 and IE_SP2 may be alternately arranged in the first direction DR1. Alternatively, the first and second protrusions IE_SP1 and IE_SP2 may be alternately arranged in the third direction DR3 perpendicular to the first direction DR1. As another example, the first and second protrusions IE_SP1 and IE_SP2 may be alternately arranged in the first direction DR1 and the third direction DR3.

According to some embodiments of the present disclosure, it may be possible to increase a surface area of a reception electrode and/or a transmission electrode by forming a surface of the reception electrode and/or the transmission electrode provided inside an input device in a concave-convex structure. As a result, the signal reception performance and/or signal transmission performance of the input device may be improved without increasing the length of each of the reception electrode and/or the transmission electrode.

According to some embodiments of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims, and their equivalents.

While aspects of the present disclosure have been described with reference to some embodiments thereof, it will be apparent to those of ordinary skill in the art that various changes and modifications may be made thereto without departing from the spirit and scope of embodiments according to the present disclosure as set forth in the following claims and their equivalents.

What is claimed is:
1. An input device comprising:
a housing;
a tip electrode protruding outside of the housing and configured to transmit a downlink signal to the outside;
a reception electrode inside the housing and configured to receive an uplink signal from the outside; and
a communication circuit electrically connected to the tip electrode and the reception electrode and configured to receive the uplink signal from the reception electrode or to transmit the downlink signal to the tip electrode,
wherein a surface of the reception electrode has a concave-convex structure,
the reception electrode includes a plurality of reception protrusions spaced apart from each other,
the reception protrusions has one shape of a hemisphere, a cylinder column, or a polygonal column.

2. The input device of claim 1, wherein the reception electrode has a structure in which a surface area is reduced toward the tip electrode.

3. The input device of claim 2, wherein each of the reception protrusions has a same size.

4. The input device of claim 2, wherein sizes of the reception protrusions are reduced toward the tip electrode.

5. The input device of claim 1, further comprising:
a transmission electrode inside the housing, spaced apart from the tip electrode, and configured to be used to calculate slope information of the input device.

6. The input device of claim 5, wherein a surface of the transmission electrode has a concave-convex structure.

7. The input device of claim 6, wherein the transmission electrode includes a plurality of transmission protrusions spaced apart from each other.

8. The input device of claim 7, wherein each of the transmission protrusions has a shape of one of a cylinder column, a circular cone, and a faceted cone.

9. The input device of claim 7, wherein the reception electrode includes a plurality of reception protrusions spaced apart from each other, and
wherein the reception protrusions have shapes different from shapes of the transmission protrusions.

10. An input device comprising:
a housing;
a tip electrode protruding outside of the housing;
an internal electrode inside of the housing;
a communication circuit electrically connected to the tip electrode and the internal electrode,
wherein a surface of the internal electrode has a concave-convex structure,
the internal electrode includes a plurality of protrusions spaced apart from each other,
the protrusions has a shape of one of a hemisphere, a circular cone, a cylinder column, a polygonal column, and a faceted cone.

11. The input device of claim 10, wherein the protrusions have a same shape.

12. The input device of claim 10, wherein the protrusions include:
a plurality of first protrusions; and
a plurality of second protrusions alternately arranged with the first protrusions and having shapes different from shapes of the first protrusions.

13. The input device of claim 12, wherein each of the first protrusions has a hemisphere shape, and
wherein each of the second protrusions has a shape of a circular cone or a faceted cone.

14. An electronic device comprising:
a display device including a display panel and an input sensor on the display panel; and
an input device configured to receive an uplink signal from the input sensor and to output a downlink signal to the input sensor,
wherein the input device includes:
a housing;
a tip electrode protruding outside of the housing and configured to transmit a downlink signal to the outside;
a reception electrode inside the housing and configured to receive an uplink signal from the outside; and
a communication circuit electrically connected to the tip electrode and the reception electrode and configured to receive the uplink signal from the reception electrode or to transmit the downlink signal to the tip electrode,
wherein a surface of the reception electrode has a concave-convex structure,
the reception electrode includes a plurality of reception protrusions spaced apart from each other,
the reception protrusions has a shape one of a hemisphere, a cylinder column, or a polygonal column.

* * * * *